United States Patent
Heeter

(10) Patent No.: US 10,262,334 B2
(45) Date of Patent: Apr. 16, 2019

(54) ELECTRONIC BRAND AUTHENTICATION METHOD USING SCANNABLE CODES

(71) Applicant: Thomas W. Heeter, Jacksonville, FL (US)

(72) Inventor: Thomas W. Heeter, Jacksonville, FL (US)

(*) Notice: Subject to any disclaimer, the term of this patent is extended or adjusted under 35 U.S.C. 154(b) by 0 days.

(21) Appl. No.: 15/659,782

(22) Filed: Jul. 26, 2017

(65) Prior Publication Data

US 2017/0352053 A1 Dec. 7, 2017

Related U.S. Application Data

(63) Continuation of application No. 14/741,520, filed on Jun. 17, 2015, which is a continuation-in-part of application No. 13/509,041, filed on May 10, 2012, which is a continuation-in-part of application No. PCT/US2011/002986, filed on Nov. 17, 2010, which is a continuation-in-part of application No. 12/590,940, filed on Nov. 17, 2009, now Pat. No. 8,483,448, said application No. 14/741,520 is a continuation-in-part of application No. 14/079,402, filed on Nov. 13, 2013, and a continuation-in-part of application No. PCT/US2011/008550, filed on May 13, 2011, said application No. 14/741,520 is a continuation-in-part of application No. 14/206,628, filed on Mar. 12, 2014, now abandoned.

(60) Provisional application No. 61/852,108, filed on Mar. 15, 2013, provisional application No. 62/014,853, filed on Jun. 20, 2014.

(51) Int. Cl.
*G06Q 30/02* (2012.01)
*G06Q 30/00* (2012.01)

(52) U.S. Cl.
CPC ....... *G06Q 30/0248* (2013.01); *G06Q 30/018* (2013.01)

(58) Field of Classification Search
CPC .................. G06Q 30/0248; G06Q 30/018
USPC ................ 235/454, 462.09, 487, 491, 494
See application file for complete search history.

(56) References Cited

U.S. PATENT DOCUMENTS 7,677,461 B2 * 3/2010 Chu .............. G06F 3/147
  235/375
8,162,219 B2 * 4/2012 Pine ............. G06K 9/00
  235/454

(Continued)

*Primary Examiner* — Paultep Savusdiphol
(74) *Attorney, Agent, or Firm* — John R Casperson

(57) ABSTRACT

A "scannable logo" image contains encoded identity data for the logo brand owner, encoded visual identification characteristics for the logo brand, an encoded GPS data corresponding to manufacturing location for a manufactured item or assembled item, plus additional embodiment dependent data. The image is scanned with the image scanning function of a mobile communication device and the encoded logo brand owner identity data, the encoded visually identifying characteristics for the logo brand, and the encoded GPS location information are decoded with a decoding function. The GPS location information is captured for the mobile communication device with the GPS function of the mobile communication device, and compared to the decoded GPS location information. If the decoded information is a geo-proximal match, an authentication application is launched in the computer function of the mobile communication device.

21 Claims, 30 Drawing Sheets

IS A VISIBLE LOGO WITH A DEPICTION OF
AN "INVISIBLE SCANNABLE CODE" LAYER ADDED

INVISIBLE INK LAYER

VISIBLE INK LAYER

(56) References Cited

U.S. PATENT DOCUMENTS

| | | | | |
|---|---|---|---|---|
| 2004/0022422 | A1* | 2/2004 | Yamauchi | G06Q 10/08 382/115 |
| 2007/0115499 | A1* | 5/2007 | Kimura | G06K 19/14 358/1.15 |
| 2007/0152056 | A1* | 7/2007 | Tuschel | G06K 19/06037 235/454 |
| 2007/0164117 | A1* | 7/2007 | Swiler | B05D 5/06 235/491 |
| 2007/0291988 | A1* | 12/2007 | Karimov | G06K 19/08 382/103 |
| 2008/0230402 | A1* | 9/2008 | Macor | G06Q 30/018 206/0.81 |
| 2009/0173791 | A1* | 7/2009 | Pine | G06K 9/00 235/454 |
| 2014/0122889 | A1* | 5/2014 | Freund | G01S 19/14 713/176 |

* cited by examiner

DEPICTS
A STANDARD LOGO

DEPICTS A VISIBLE LOGO INTEGRATED
WITH A 2D SCANNABLE CODE

DEPICTS A MANUFACTURED COFFEE CUP
WITH A SCANNABLE CODE

IS A VISIBLE LOGO WITH A DEPICTION OF
AN "INVISIBLE SCANNABLE CODE" LAYER ADDED

INVISIBLE
INK LAYER

VISIBLE
INK LAYER

DEPICTS THE BOUNCE FLASH FEATURE
FOR THE INVISIBLE INK EMBODIMENT

DEPICTS THE CURRENCY EMBODIMENT
OF THE INVENTION

DEPICTS THE CURRENCY EMBODIMENT OF THE INVENTION

DEPICTS THE ELECTRONIC DEVICE EMBODIMENT OF THE INVENTION

DEPICTS THE REMOTE CONTROL EMBODIMENT
OF THE INVENTION

DEPICTS THE MOTORIZED VEHICLE EMBODIMENT
OF THE INVENTION

DEPICTS A MANUFACTURED ITEM FOR
CONSUMER ASSEMBLY EMBODIMENT

DEPICTS HOW THE VISUAL CIPHER WORKS

BEFORE -- PIXELATED SQUARES 1 TO 1 CONSECUTIVE SEQUENCE

AFTER -- PIXEL SQUARES MOVED TO  NON-CONSECUTIVE SEQUENCE

TITLE 1: BAR CODE BASED INVOICE PAYMENT METHOD

TITLE 2: BAR CODE BASED BANK DEPOSIT METHOD

TITLE 3: BAR CODE BASED CHECK PAYMENT METHOD

TITLE 5: BAR CODE BASED DOCUMENT MAILING METHOD

TITLE 5: BAR CODE BASED DOCUMENT MAILING METHOD

TITLE 5: BAR CODE BASED DOCUMENT MAILING METHOD

TITLE 5: BAR CODE BASED DOCUMENT MAILING METHOD

TITLE 6: BAR CODE BASED ACCOUNTING METHOD

TITLE 7: BAR CODE BASED RECEIPT PAYMENT METHOD

TITLE 8: BAR CODE BASED ANONYMOUS PAYMENT METHOD

TITLE 8: BAR CODE BASED ANONYMOUS PAYMENT METHOD

TITLE 9: BAR CODE BASED PRIVATE PAYMENT METHOD

FRONT OF CARD

BACK OF CARD

TITLE 10: BAR CODE BASED ELECTRONIC SHOPPING METHOD

TITLE 11: COLOR BASED BAR CODE HIERARCHY METHOD

| 2D BAR CODE REFERENCE | |
|---|---|
| ADVERTIZING & SOCIAL MEDIA | RED |
| MANUFACTURING & INVENTORY | ORANGE |
| WARNINGS & CAUTION | YELLOW |
| FINANCIAL TRANSACTIONS | GREEN |
| RETAIL PRODUCT INFORMATION | BLUE |
| EDUCATIONAL | INDIGO |
| GOVERNMENT & MEDICAL | VIOLET |
| IDENTIFICATION | BLACK |

HUMAN VIEW     SCANNER VIEW

CATEGORY BITS

SCANNING

TITLE 11: COLOR BASED BAR CODE HIERARCHY METHOD

TITLE 12: BAR CODE BASED DOOR ENTRY SYSTEM

TITLE 13: BAR CODE BASED REGISTRATION VALIDATION METHOD

TITLE 14: BAR CODE BASED REMOTE CONTROL SYSTEM

TITLE 14: BAR CODE BASED REMOTE CONTROL SYSTEM
FIG. 46
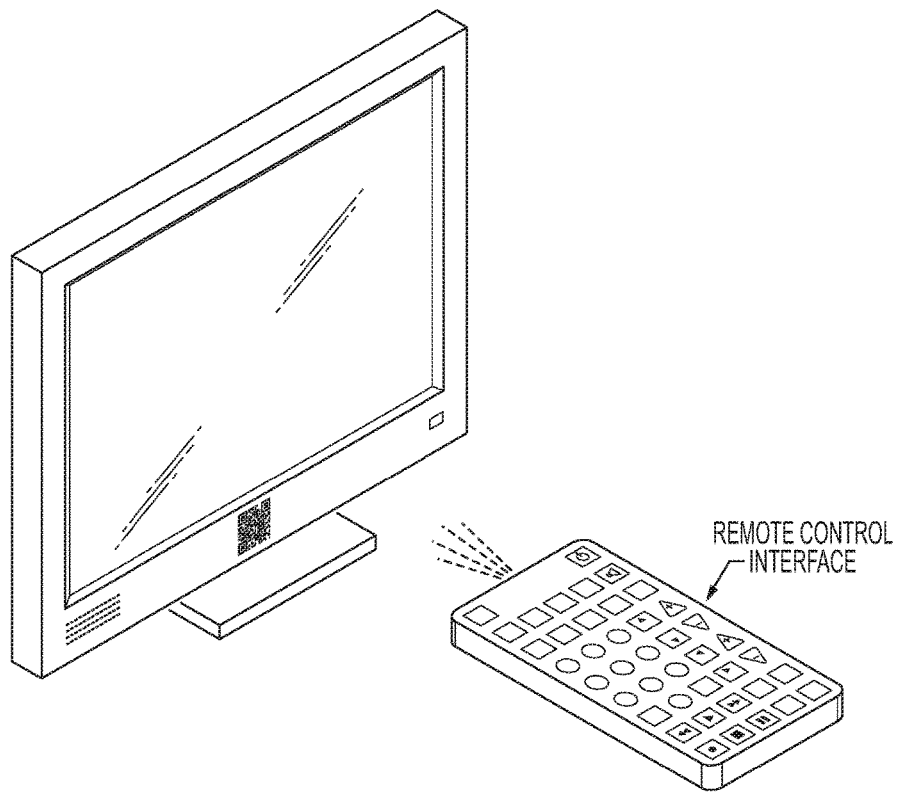
TITLE 15: BAR CODE BASED SIGNATURE VALIDATION METHOD
FIG. 47
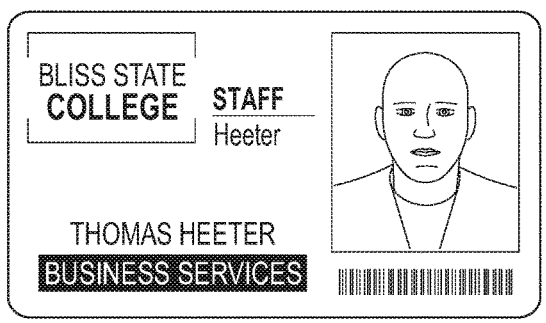
FIG. 48
*Tom Heeter*
SIGNATURE

TITLE 15: BAR CODE BASED SIGNATURE VALIDATION METHOD

TITLE 15: BAR CODE BASED SIGNATURE VALIDATION METHOD

TITLE 16: BAR CODE TEMPORAL SECURITY METHOD

ELECTRONIC BRAND AUTHENTICATION METHOD USING SCANNABLE CODES

CROSS REFERENCES TO RELATED APPLICATIONS

This application is a continuation of application Ser. No. 14/741,520 filed Jun. 17, 2015.

Application Ser. No. 14/741,520 was a continuation in part and claimed the benefit of copending U.S. application Ser. No. 13/509,041 filed May 10, 2012, which was a continuation in part of and claimed the benefit of PCT application number PCT/US2011/02986, filed Nov. 17, 2010, which was a continuation in part of and claimed the benefit of U.S. application Ser. No. 12/590,940 filed Nov. 17, 2009, now U.S. Pat. No. 8,483,448 issued Jul. 9, 2013.

Application Ser. No. 14/741,520 was a continuation in part of and claimed the benefit of copending U.S. application Ser. No. 14/079,402 filed Nov. 13, 2013, which claimed the benefit of US provisional patent application No. 61/852,108 filed Mar. 15, 2013, and was also was a continuation in part of and claimed the benefit of PCT application number PCT/US2011/00855, which had an international filing date of May 13, 2011. Application Ser. No. 14/741,520 was a continuation is part of and claimed the benefit of copending U.S. application Ser. No. 14/206,628 filed Mar. 12, 2014 which claimed the benefit of US Provisional Patent Application 61/852,108 filed on Mar. 15, 2013.

Application Ser. No. 14/741,520 was a nonprovisional application claiming the benefit of provisional application for patent No. 62/014,853 filed Jun. 20, 2014.

FIELD OF INVENTION

The present invention relates to the use of machine readable codes for the purpose of authenticating business brands or logos in a secure manner.

BACKGROUND OF INVENTION

Scannable codes, specifically 2D bar codes, have shown wide commercial acceptance from the period of 2011 forward. The widest use depicted enables such codes to be scanned by a mobile device such as a smart-phone or tablet computer (iPad, Android table, or Microsoft tablet), which are then linked to an informational website, which is displayed on the given mobile device. Though RFID systems such as Google Wallet, and low cost "wireless" slide systems, such as Square have had the greatest market acceptance, there has also been some adoption of using 2D bar codes for making payments with mobile devices. The various embodiments described herein expand the field of 2D bar code authentication to embodiments outside the areas of linked URL pages, and mobile payments; specifically, using scannable codes to authenticate brands or logos.

The disclosure of my earlier patent, U.S. Pat. No. 5,878, 155, issued Mar. 2, 1999 is incorporated herein by reference. In U.S. Pat. No. 5,878,155, a payment method is described wherein an embodiment incorporates the use of scannable codes to authenticate a party, specifically the application of invisible, indelible marks for purposes of identification in order to conducting monetary and credit transactions in a secure manner.

The disclosure of my earlier patent, U.S. Pat. No. 8,484, 448, issued Jul. 9, 2013 and based on U.S. application Ser. No. 12/590,940 filed Nov. 17, 2009 is incorporated herein by reference. In U.S. Pat. No. 8,484,448, bar code information is scanned and characteristics about the scanned code are compared to characteristics about other codes stored in a database for the specific time period in question in order to verify the identity of the buyer for a given time period. U.S. Pat. No. 8,483,448 further provides that the identity step can include a database point of scan identity confirmation by digital image of the presumptive user of the system, wherein the specific embodiment disclosed was for the purpose of making a payment.

In my application number U.S. Ser. No. 13/509,041 filed May 10, 2012 titled ELECTRONIC SALES METHOD", which is a continuation in part, and claims the benefit of PCT application number PCT/US2011/02986, with a priority date of Nov. 17, 2009, the disclosure of which is incorporated herein by reference, an authentication method is disclosed that employs temporary tattoos, decals, or labels in a series, which are scanned by a smart-phone to authenticate a person's identity, and wherein a specific embodiment disclosed was for the purpose of making a payment.

In my application number U.S. Ser. No. 13/509,041, there is further provided an embodiment for attaching a decal or sticker with a 2D scannable code to a blank "credit/debit" card, driver's license, or other ID card which contains an image, which links the image and identity data to a 2D scannable code; specifically, a multiple-payment-option charge card comprising a rectangular card carrying a multiplicity of differing two-dimensional data matrix codes in the form of decals, stamps or stickers, each data matrix code encrypting a buyer's charge or debit card information, or electronically linkable to the buyer's charge or debit card information, the charge or debit card information being different for each code carried by the card.

In my application number application number U.S. Ser. No. 14/079,402, filed Nov. 13, 2013 titled METHODS FOR CONDUCTING ELECTRONIC PAYMENT TRANSACTIONS WITH SCANNABLE CODES", which claims the benefit of PCT patent application number PCT/US2011/00855 filed May 13, 2011, presents a method that is carried out by providing an image of the bar code at a point of sale for goods or services, capturing an image of the bar code, or reading it, with the camera function of a smart-phone, processing the image with the smart-phone application to form a wirelessly transmittable data file, wirelessly transmitting the data file, and wherein a specific embodiment disclosed is an authentication procedure wherein the merchant's identity is specifically contained in a scannable code in such as way that it serves as a functional replacement to the conventional "payment by check" system, with the 2D bar code containing embedded critical data (such as payor, account information, and amount) in place of alpha-numeric printed matter as currently done though the check system.

In my application number U.S. Ser. No. 14/079,402, another embodiment provides for randomly generating a new 2D bar code containing a proxy identity of the payee, preferably, for each transaction, so that the payee's true identity is protected and is only displayed through the proxy as depicted in the scannable 2D bar code.

In my application number U.S. Ser. No. 14/079,402, another embodiment provides for a security feature wherein the user of the smart-phone who wishes to use the disclosed payment app software maintains a "self identity" scannable 2D bar code on a separate card or personal object, which when scanned by their own smart-phone enables access to the payment app, so that if the mobile device is lost, others would be prevented from using the mobile app.

In my patent application number U.S. Ser. No. 14/206,628 filed Mar. 12, 2014 titled "METHODS FOR ELECTRONIC CHECK-IN USING SCANNABLE CODES", the disclosure of which is incorporated herein by reference, an authentication method is disclosed that provides for a retail merchant displaying an image of a previously created logo simultaneously with a 2D scannable code, with the 2D scannable code including an embedded numeric geo-code corresponding to a precision GPS coordinate for that business, such that a consumer can travel to said merchant, and effect an automated "check-in" through a single scan of the 2D scannable code without manually entering additional user data or selecting from possible alternative check-in locations wherein the specific embodiment disclosed scans and decodes the numeric geo-code, compares the decoded result to the calculated GPS co-ordinates, and effects a "check-in" based on a match.

In my application number U.S. Ser. No. 14/206,628, another embodiment provides for an alternative "check-in" in lieu of using a numerical geodesic code, wherein a mobile communication device is provided having computer function, a GPS function, an image scanning function and an image decoding function such that a consumer can travel to said merchant, and effect a "check-in" through a single scan of the 2D scannable code, then selecting from possible alternative check-in locations based on address location, wherein the specific embodiment disclosed the user scanning the scannable 2D bar code from which the smart-phone's GPS function determines the location, and then compares result to the estimated GPS coordinates based on address, and thereby effects a "check-in" based on matching criteria.

In my application number U.S. Ser. No. 14/206,628, another embodiment provides for an alternative "check-in" based on a predetermined or pre-specified geo-coordinate range wherein a mobile communication device is provided having computer function, a GPS function, an image scanning function and an image decoding function, wherein the specific embodiment disclosed the user scanning the scannable 2D bar code from which the smart-phone's GPS function determines the location, and then compares result to the calculated GPS co-ordinates, as well as, the expected result from the related business identity information, and if the calculated location is determined to be within the predetermined geo-coordinate range launches a software application, else the software application is restricted from launching.

In my application number U.S. Ser. No. 14/206,628, an alternative embodiment provides for automatically populating certain of the required fields during the "check-in" function, wherein a transaction application software pertaining to the business identity responds to a positive comparison between the captured GPS location information and the GPS location information in the computer memory, wherein a mobile communication device is provided having computer function, a GPS function, and an access function for accessing a computer memory containing business identity information stored in association with GPS location information for a business, appends required data to the business identity data.

In my application number U.S. Ser. No. 14/206,628, an alternative embodiment provides for applying an image of a bar code or other scannable image on the manufactured item itself for each item being purchased is presented, wherein the specific embodiment disclosed is for conducting an electronic payment In my application number U.S. Ser. No. 14/206,628, an alternative embodiment provides for applying an image of a bar code or other scannable image for each item being purchased from an invoice or receipt, wherein the specific embodiment disclosed is for conducting an electronic payment.

In my application number U.S. Ser. No. 14/206,628, an alternative embodiment provides for displaying a 2D scannable code on a bank check or deposit slip, wherein the specific embodiment disclosed is for making a bank or other financial deposit.

In my application number U.S. Ser. No. 14/206,628, an alternative embodiment provides for a method for giving directions such that a recipient of a scannable 2D bar code "travel token" scans the bar code with the scanning function of the mobile communication device, decodes an encoded geographic location with the decoding function of the mobile communication device, and then maps the geographic location with the mapping function of the mobile communications device.

In my application number U.S. Ser. No. 14/206,628, an alternative embodiment provides for a method for human identification in a manner comparable to that set forth in my patent application U.S. Ser. No. 13/509,041, but with the addition of geographical validation elements.

In my application number U.S. Ser. No. 14/206,628, an alternative embodiment provides for applying a scannable 2D bar code to an item of item of paper currency, which enables for periodic consumer electronic queries concerning the item of paper currency, through scanning data from the 2D bar code, which encodes a unique serial number.

In my application number U.S. Ser. No. 14/206,628, an alternative embodiment provides for applying a scannable 2D bar code to a document as a method of validating a signature on a document. The method employs a user's smart-phone or other mobile device having a GPS function. The method comprises capturing the geodesic code for the location of the smart-phone, identifying information such as the person's name, and document identification information, and then transmits the information to a printer which then prints out as a scannable 2D bar code encoding the information, on the document itself or a label, decal or sticker, that is then attached to the document in such as way as to independently attest to the time and a place of the person's signature. The scannable 2D bar code is also recorded in computer memory associated with the signatory for the document and is electronically accessible to the signatory upon a scanned query being received from a third party.

In my application number U.S. Ser. No. 14/206,628, an alternative embodiment provides for applying a scannable 2D bar code to an electronic device as a method switching an electronic device to an opposite state in response to authentication, wherein the specific embodiments disclosed are for actuating a electro-mechanical lock and arming/disarming an alarm system. The method is carried out by transmitting a unique 2D, RF or magnetic code to a reader operatively coupled to an electronic device. The codes is read and authenticated in a computer memory device operatively associated with the reader.

In my application number U.S. Ser. No. 14/206,628, an alternative embodiment provides a method for programming an interactive electronic device in a native language, wherein the specific embodiments disclosed are a programmable television remote, an internet service provider's router, and electronic appliances. The method comprises displaying a scannable 2D bar code on the interactive electronic device. The scannable 2D bar code encodes instructions for linking to a language database for programming the interactive electronic device in a selected language. The bar code is scanned with a mobile communication device and communication is established between the language database and the interactive electronic device. A programming language is then selected from a list of default languages presented in response to geodesic information transmitted from the mobile communication device or encoded in the scanned 2D bar code.

In my application number U.S. Ser. No. 14/206,628, an alternative embodiment provides for scanning a scannable 2D bar code to motor vehicle tag having a 2D bar code affixed thereon, which enables for periodic electronic queries concerning the vehicle and the vehicle owner, or encoding a scannable link to a database containing such information.

In my application number U.S. Ser. No. 14/206,628, an embodiment provides for a two-dimensional bar code having a portion of the bar code in an ink that is a different color than the remainder of the bar code to indicate bar code subject matter according to a standardized convention.

Reference is made to U.S. Pat. No. 8,198,980, Luger, titled Numeric Geodesic locator, wherein the invention is described as embodying "an input method for receiving from a user a numeric code representing a geographic destination and in a format limited solely to digits, where said format represents said geographic destination". Specifically, such a method lends itself to representation in the form of a scannable code that yields a data string (e.g. a numeric string which in turn represents a geodesic coordinate).

SUMMARY OF THE INVENTION

A method is presented for a manufactured or assembled item, whereby an image of a 2D bar code or other scannable image, which yields a data string is presented, together with a business logo brand image to create a "scannable logo", which contains encoded identity data for the logo brand owner, encoded visual identification characteristics for the logo brand, an encoded GPS data corresponding to manufacturing location for a manufactured item or assembled item, plus additional embodiment dependent data. Preferably, this embodiment includes an encoded specific time period, only during which the image comprising the scannable logo can be displayed from a manufactured or assembled item, in such as way that it can be scanned for the first time by a mobile device. The image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is initially launched at a manufacturing facility, and if the decoded identity data for the logo brand owner, decoded visual identification characteristics for the logo brand, and decoded GPS data are successfully matched against a registry database for validity, an inventory control log is created and/or incremented.

In another embodiment, a method is presented for electronically deliverable items, whereby an image of a 2D bar code or other scannable image which yields a data string is presented together with a business logo brand image to create a "scannable logo", which contains encoded identity data for the logo brand owner, encoded visual identification characteristics for the logo brand, and encoded GPS data corresponding to a distribution region location for a digitally deliverable content, plus additional embodiment dependent data. The image is scanned with the image scanning function of the mobile communication device and the logo brand owner identity data, the visually identifying characteristics of the scannable logo, and the encoded GPS location information is decoded with the image decoding function. The GPS location information is captured for the mobile communication device with the GPS function of the mobile communication device, and compared to the decoded GPS location information. If the decoded GPS information is within the correct region, an authentication application is launched in the computer function of the mobile communication device, with any corresponding instruction being displayed in the most probable written language associated with a given geo-location area and automatically saved on the user's local device. The authentication application has certain required fields, which include time and date that the mobile device scans the scannable logo to effect authentication, which are automatically populated each time the authentication application is launched. Upon proper authentication, digital content is transmitted to one or more devices.

In another embodiment depicting authentication after manufacturing, an image of a 2D bar code or other scannable image, which yields a data string is presented, together with a business logo brand image to create a "scannable logo", which contains encoded identity data for the logo brand owner, encoded visual identification characteristics for the logo brand, and encoded GPS data corresponding to manufacturing location for a manufactured item or assembled item, plus additional embodiment dependent data. The image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information matching the address coordinates or geo-coordinates of a custom's facility, wholesale facility, distribution facility or retail location. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is launched, subsequent to the initial launch at the manufacturing facility, and if the decoded identity data for the logo brand owner, decoded visual identification characteristics for the logo brand, and decoded GPS data are successfully matched against a registry database for validity, then a tracing log is displayed on the mobile device tracing items transit history from the manufacturing or assembly location thru to the retail location.

In another embodiment where the manufactured item is paper currency, or stamps, whereby an image of a 2D bar code or other scannable image, which yields a data string is presented, together with a physical specimen of the currency or stamp to create a "scannable currency", which contains encoded identity data for the currency or stamp, encoded visual identification characteristics for the currency or stamp denomination, and encoded GPS data corresponding to government printing office location for a printed item, plus additional embodiment dependent data. Preferably, this embodiment includes an encoded specific time period, only during which the scannable 2D bar code can be displayed from a government printed item in such as way that it can be scanned for the first time by a mobile device. Also, preferable would be to have all mobile devices in this embodiment to be carefully configured and under the exclusive control of the US government printing office. The 2D bar coded image is scanned with the image scanning function of the mobile communication device and the encoded currency or stamp identity data, the encoded visually identifying characteristics for the currency or stamp denominations, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable currency to effect authentication, which are automatically populated each time the authentication application is launched. Additionally, when the authentication application is initially launched at the government printing facility, and if the decoded identity data for the logo paper currency or stamps, decoded visual identification characteristics for the currency or stamp denominations, and decoded GPS data are successfully matched against a registry database for validity, an inventory control log is created and/or incremented.

In another embodiment depicting authentication after paper currency or stamps are printed, an image of a 2D bar code or other scannable image, which yields a data string is presented, together with a physical specimen of the currency or stamp to create a "scannable currency", which contains encoded identity data for the currency or stamp, encoded visual identification characteristics for the currency or stamp denomination, and encoded GPS data corresponding to government printing office location for a printed item, plus additional embodiment dependent data. The image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information matching the address coordinates or geo-coordinates of a treasury facility, correspondent banking facility, wholesale facility, distribution facility or retail banking location. If the decoded information is a geo-proximal match, an authentication application is launched in the computer function of the mobile communication device. The authentication application has certain required fields, which include time and date that the mobile device scans the scannable currency to effect authentication, which are automatically populated each time the authentication application is launched. Additionally, when the authentication application is launched subsequent to the initial launch at the government printing facility and if the decoded identity data for the logo paper currency or stamps, decoded visual identification characteristics for the currency or stamp denominations, and decoded GPS data are successfully matched against a registry database for validity, then a tracing log is displayed on the mobile device tracing items transit history from the manufacturing or assembly location thru to the retail bank which ultimately receives the cash.

In an embodiment where the manufactured item or assembled item is a electronic network packet switching, routing device, or other internet service provider modem device, whereby an image of a 2D bar code or other scannable image, which yields a data string is presented, together with a business logo brand image to create a "scannable logo", which contains encoded identity data for the logo brand owner, encoded visual identification characteristics for the logo brand, encoded electronic device model characteristics, and encoded GPS data corresponding to manufacturing location for a manufactured item or assembled item, plus additional embodiment dependent data. Preferably, this embodiment includes an encoded specific time period, only during which the image comprising the scannable logo can be displayed from a manufactured or assembled item, in such as way that it can be scanned for the first time by a mobile device. The image is scanned with the image scanning function of the mobile communication device and the encoded logo brand owner identity data, the encoded visually identifying characteristics for the logo brand, encoded electronic device model characteristics, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is initially launched at the manufacturing facility, and if the decoded identity data for the logo brand owner, decoded visual identification characteristics for the logo brand, electronic device model characteristics, and decoded GPS data are successfully matched against a registry database for validity, an inventory control log is created and/or incremented. Further, native programming language "firmware" is downloaded in response to successful initial authentication based on the decoded model number characteristics. User guides, software and other collateral materials to the electronic device are electronically linked, and a corresponding scannable logo can be applied to collateral materials prior to shipping the electronic device. Preferably, the scannable logo is affixed both to the chassis of the electronic device, and displayed through a visual display when the electronic device is activated. As with other embodiments, a tracing log is created as the electronic device is shipped from the manufacturing facility to the ultimate retailer, who sells the item to the consumer. The consumer, can also scan the scannable logo, and the electronic device is "automatically registered" by capturing the consumer's geo-location information through the mobile computing devices GPS function along with other consumer identification data.

In an embodiment where the electronically deliverable content is a software application that functions as a electronic appliance remote control, whereby an image of a 2D bar code or other scannable image which yields a data string is presented together with a business logo brand image to create a "scannable logo", which contains encoded identity data for the logo brand owner, encoded visual identification characteristics for the logo brand, encoded electronic device model characteristics, and encoded GPS data corresponding to a distribution region location for a digitally deliverable content, plus additional embodiment dependent data. The image is scanned with the image scanning function of the mobile communication device and the logo brand owner identity data, the visually identifying characteristics of the scannable logo, encoded electronic device model characteristics, and the encoded GPS location information is decoded with the image decoding function. The GPS location information is captured for the mobile communication device with the GPS function of the mobile communication device, and compared to the decoded GPS location information. Based on the decoded GPS information, as compared to the most probable languages of the region, corresponding instructions are displayed in the most probable written language associated with the given geo-location area and subject to use validation are saved on the user's local device. Additionally, when the authentication application is initially launched at the consumer's home, and if the decoded identity data for the logo brand owner, decoded visual identification characteristics for the logo brand, electronic device model characteristics, and decoded GPS data are successfully matched against a manufacturer's registry database for validity, the "remote control" is automatically registered to that device for a certain model appliance, and a manufacturer's control log is created and/or incremented. Further, native programming language "firmware" is downloaded in response to successful consumer authentication based on the decoded model number characteristics. User guides, software and other collateral materials to the electronic device are electronically linked, and a corresponding scannable logo can be applied to collateral materials prior to shipping the electronic device. Preferably, the scannable logo is affixed both to the chassis of the electronic device, and displayed through a visual display when the electronic device is activated. The consumer, can also scan the scannable logo, and the electronic device is "automatically registered" by capturing the consumer's geo-location information through the mobile computing devices GPS function along with other consumer identification data. Preferably, the logo identity data would include a serial number for the electronic device so connected to the virtual "remote control".

In an embodiment where the manufactured item is a motor vehicle or pre-manufactured home, whereby an image of a 2D bar code or other scannable image, which yields a data string is presented, together with a business logo brand image to create a "scannable logo", which contains encoded identity data for the logo brand owner, encoded visual identification characteristics for the logo brand, and encoded GPS data corresponding to manufacturing location for a manufactured item or assembled item, plus additional embodiment dependent data such as an encoded Vehicle Identification Number and other model characteristics. Preferably, this embodiment includes an encoded specific time period, only during which the image comprising the scannable logo can be displayed from a manufactured or assembled item, in such as way that it can be scanned for the first time by a mobile device. The image is scanned with the image scanning function of the mobile communication device and the encoded logo brand owner identity data, the encoded visually identifying characteristics for the logo brand, encoded electronic device model characteristics, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is initially launched at the manufacturing facility, and if the decoded identity data for the logo brand owner, decoded visual identification characteristics for the logo brand, decoded Vehicle Identification Number and other model characteristics, and decoded GPS data are successfully matched against a registry database for validity, an inventory control log is created and/or incremented. User guides, software and other collateral materials to the electronic device are electronically linked, and a corresponding scannable logo can be applied to collateral materials prior to shipping the electronic device. Preferably, the scannable logo is affixed both to the chassis of the vehicle, and displayed through a visual display in the vehicle's instrument cluster when the vehicle is activated. As with other embodiments, a tracing log is created as the electronic device is shipped from the manufacturing facility to the ultimate retailer, who sells the item to the consumer. The consumer, can also scan the scannable logo, and the vehicle can be electronically registered" by capturing the consumer's geo-location information through the mobile computing devices GPS function along with other consumer identification data, which is forwarded to a state's vehicle registration department for e-registering in real time.

In another embodiment depicting authentication where an item is sold in "kit" form and assembled at the consumer's home address, an image of a 2D bar code or other scannable image, which yields a data string is presented, together with a business logo brand image to create a "scannable logo", which contains encoded identity data for the logo brand owner, encoded visual identification characteristics for the logo brand, and encoded GPS data corresponding to manufacturing location for the components to be assembled, plus additional embodiment dependent data. As set forth the other preferred manufacturing embodiment, the manufactured components have a tracing log that can be viewed by scanning the scannable logos for each component or if a small item like screws, the container holding multiple items. The 2D scannable bar code image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information matching the address coordinates or geo-coordinates of a consumer's address to activate the warranty for the item. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is launched, subsequent to the initial launch at the manufacturing facility, and if the decoded identity data for the logo brand owner, decoded visual identification characteristics for the logo brand, and decoded GPS data are successfully matched against a registry database for validity, then a tracing log for each sub-component is displayed on the mobile device, tracing items transit history from the manufacturing thru to the assembly location, with the retail location of pickup being one entry in the tracing log.

Common to the preferred embodiments, the data communication channel for all the data transmissions is encrypted. A preferred feature of this embodiment would utilize a bar code image cipher (hashing the image) in combination with bit data channel encryption (128-2048 bits) across a high speed connection such as 3G, 4G, Wi-Max, or Wi-Fi, but the embodiments herein can be adapted to lower bandwidth by one skilled in the art. Additionally, while the embodiments are depicted, where both the logo and corresponding scannable code(s) are visible, it is preferred that for all embodiments except for consumer point of view access, the 2D scannable codes are presented at frequencies above or below human visible light so as: 1. Not to affect the aesthetics of an any logo design, and 2. Not be visual to a viewer without the assistance of a camera capable of capturing such frequencies, thus being more secure. The logo and one or more scannable 2D bar codes can be visually displayed in layers for scanning. Further, as stated earlier, it preferred that the visual display incorporate a cipher to prevent unauthorized decoded without a key. Finally, the data packages sent across the computer networks should be encrypted in addition to encrypting the communication channels themselves.

In another embodiment, the scannable logo is etched into metal wherein the electro-saltwater etching method is used.

In another embodiment, an electro-etched metal scannable logo design is inset into a plastic mold in such a way that the inset remains visible after the molding process is complete. The molding process is completed, and once removed the etched metal remains as a scannable logo.

An embodiment is presented where the mobile device incorporates a flash that strobes at frequencies above or below the visible human range, employing a mobile device with a camera function, software that captures an image above or below the visible human range, and concurrently with capturing the image, causes a light to momentarily strobe in such a way as to cause maximum reflective illumination from the bar code image (or other scannable image) to be scanned.

BRIEF DESCRIPTION OF THE DRAWINGS

The present invention may be better understood, and its numerous features and advantages made apparent to those skilled in the art by referencing the accompanying drawing.

FIG. 46 illustrates devices that can be used in the remote control method of FIG. 45.

FIG. 47 illustrates an identification card that can be verified in a bar code based validation method.

FIG. 48 illustrates a signature that can be verified in a bar code based verification method.

DETAILED DESCRIPTION OF THE INVENTION

Although the present invention is susceptible to different embodiments, it is to be understood that the present disclosure is to be considered as an exemplification of the principles of the invention and is not intended to limit the invention to the embodiments illustrated. For example, even though the preferred embodiments contemplated and depicted herein employ networked, GPS-enabled mobile electronic devices (e.g. smart-phones or tablets) with a camera function, the methods described herein can be accomplished using a computer with a scanning function and a hard-wired computer network.

Figure 1:
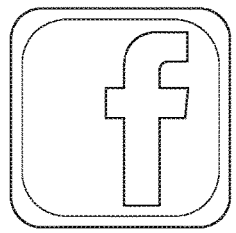
FIG. 1 depicts a standard logo.
Figure 2:
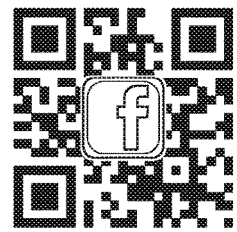
FIG. 2 depicts a visible logo integrated with a 2D scannable code.

FIG. 1 depicts a standard logo design. One embodiment describes a generic embodiment of the invention which can most aptly be described as a generic "brand authentication" method. A 2D scannable code image is appended or otherwise merged into a logo or brand image to create a "scannable logo", and recorded into a database. FIG. 2 depicts a visible logo integrated with a 2D scannable code. The 2D scannable code image or portion of the image is generated according a standardized 2D bar code generating software format and both the logo/brand image and 2D scannable image bar code are printed together directly onto a personal object. In another embodiment, the 2D scannable image plus the brand or logo image (scannable logo) is first printed onto a label, sticker or decal, which is then applied to a personal object. In another embodiment, the scannable logo image is etched into a manufactured product or molded into a manufactured product. In yet another embodiment, the scannable logo is visually displayed from an electronic display monitor. Zxing, among other companies, https://code.google.com/p/zxing has developed a source code library for generating 2D bar codes that can be modified and be adapted to a wide range 2D bar code configurations. As embodied, a trusted registrar (such as a bank, quasi-government agency, or non-profit organization) or manufacturer would assume the stewardship of maintaining the database of 2D bar codes and corresponding logo or brand databases. Packaging materials and shipping containers for products logo/brand+2D bar code would also contain the same 2D bar code or an otherwise corresponding logo/brand+2D bar code such that the manufactured product is matched to the shipping documents, sales receipts, invoice, etc. As embodied herein, different types of user/validators (customs agents, shippers, retailers, consumers, the database registrar, manufacturer) would have different features of the brand authentication software or even different software versions depending on authentication access or the specific validation step(s) to be performed. Earlier embodiments of merging an image with a 2D matrix data code (e.g. 2D bar code) are described in my patent applications.

For example, in one embodiment presented in this application the manufacturer, having downloaded the mobile software application which can determine the user's location through the smart-phone's GPS function, would scan the logo/brand+2D (hereafter "scannable logo") bar code at the manufacturing site. This would append the logo image to the generated scannable 2D bar code, time of scan, to a database that contains registration information for the brand or logo, the information about the business, and the manufacturing location to confirm it is a recognized manufacturing location. In the preferred embodiment, the GPS information would be stored as a numerical string to form a numerical geodesic code as described in Luger to form a unique manufacturing geo-code entry.

Figure 3:
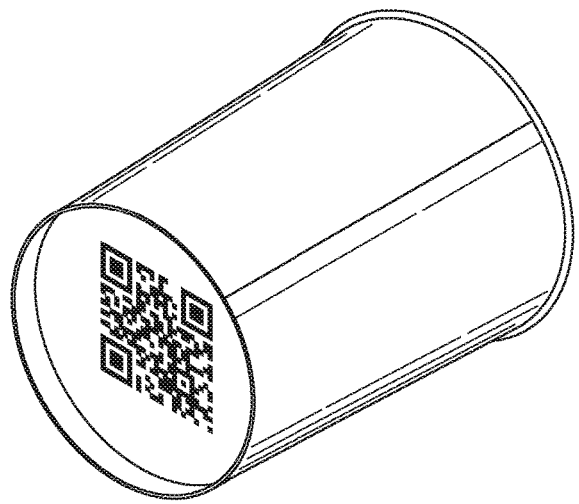
FIG. 3 depicts a manufactured coffee cup with a scannable logo.

Previously, in my patent application U.S. Ser. No. 14/206,628, I described how the authentication process works as a "check-in" method. In that embodiment, the user can travels to a local coffee shop, where the coffee shop merchant displays their logo at the front door of their retail shop which is comprised of 1. Their business graphical logo, image, or brand, plus 2. a 2D scannable bar code in which the merchant personally (or a trusted registrar) has caused to be previously embedded a scannable code which contains: the merchant's identify information, and a numerical geodesic code as described in Luger. When the consumer user arrives at the coffee shop, the consumer user scans the merchant's displayed 2D bar code containing the merchant-specific geodesic code. The scan of the 2D bar code causes the user's mobile device to capture the user's location for purposes of an automated "check-in" to the software which is connected to a social media app such as "Facebook" or "LinkedIn" for the benefit of consumers. FIG. 3 depicts a manufactured coffee cup with a scannable logo.

However, the current brand authentication embodiment expands this functionality to perform brand authentication from the point of manufacture forward. Once the logo+2D bar code is scanned at the manufacturer's location, the mobile device software creates open fields for entry of say: 1. a local government agency database linking the logo+2D bar code to the owner information, which in turn linked to say the city's local health department and the city's business permit department to be sure that the given location is cleared by the health department and has paid for the business permits; 2. the manufacturing companies database to be sure that the registered mark belongs to a properly authorized franchisee, and is not a "knockoff" store pirating the corporate identity at an undisclosed location such as a counter-fit "McDonalds"; 3. a trusted logo/brand registry similar to that of the trademark database maintained by the USPTO to be sure that the presented brand is in fact a registered brand. 4. the shipping company database to enable a scan at the point of shipping, and periodically to the point of destination to the final destination; 5. the customs agency responsible for tracking incoming manufactured items; 6. the wholesale company responsible for storing the items prior to shipping to the distributor or retail location; 7. the retail location responsible for the using the manufactured item in connection with services provided to consumers; 8. the software company responsible for printing the receipt or invoice, includes a scannable code matched to the manufactured products UPC or SKU.

Figure 4:
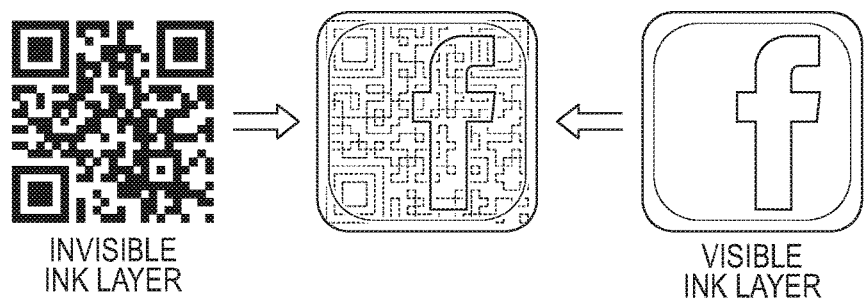
FIG. 4 is a visible logo with a depiction of an "invisible scannable code" layer added.
Figure 5:
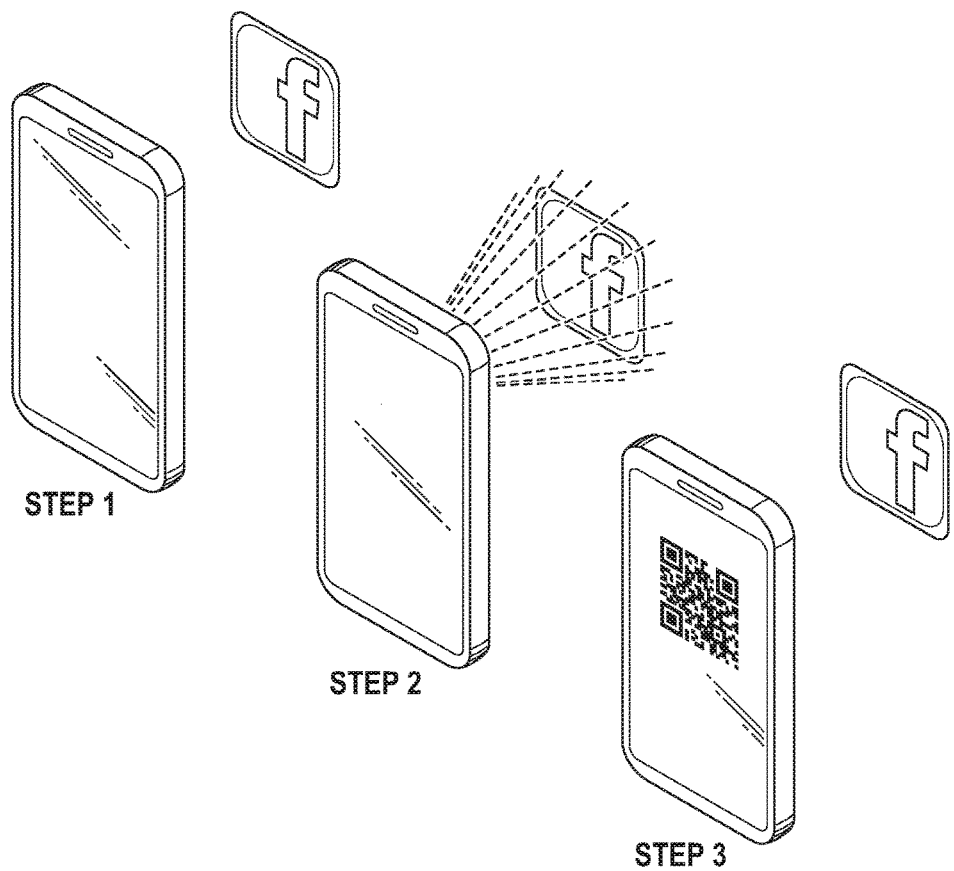
FIG. 5 depicts the bounce flash feature for the invisible ink embodiment.

Because the scan containing the geodesic code (a de-facto geo-phone number) will yield exactly one unique business location, links to multiple government agencies and corporations to validate the unique brand-business geo-location can be considered a highly reliable nexus. Although the method can be practiced where the logo and 2D bar codes were both displayed using human visible images, in the preferred embodiment, the logo/brand image and consumer 2D bar codes are visually displayed using light waves in the human visible range, whereas for government agencies, the corporate team, and/or the trusted registrar the scannable codes would be "displayed" using invisible 2D bar codes that can only be machine read by the mobile device with appropriate optical sensors, and software. The consumer 2D bar codes would most likely be visible. In my patent U.S. Pat. No. 5,878,155, I describe with particularity one embodiment of the invisible ink marking method which employs using "INVISIBLE SKIN MARKING INK #743 from Sirchie Finger Print Laboratories. Herein, invisible ink would be printed onto a white space area at or near the visually displayed logo or brand. In another visual presentation, the 2D bar code is presented in the infrared frequencies at or near the visually displayed logo, or even superimposed over the logo in functional "layers". Patents U.S. Pat. No. 6,221,270 titled Pigment Particles for Invisible Marking Applications, U.S. Pat. No. 5,138,913 titled Security Document and Method Using Invisible Coded Marks, and U.S. Pat. No. 6,174,400 titled Near Infrared Florescent Security Transfer Printing and Marking Ribbons describe in depth the process for producing scan-ready markings which fluoresce in various substrate layers representing the preferred embodiment here. It should be understood, that by using different substrates that fluoresce on different wavelengths, different interested parties will each have a 2D scannable code that is only visible to their mobile scanning device, which is the preferred method of practicing this embodiment. FIG. 4 is a visible logo with a depiction of an "invisible scannable code" layer added. Although this embodiment can be practiced in such a way that the mobile device scans using natural light conditions, a strongly desired enhancement employs a software selectable "bounce flash" such that mobile device is configured to emit an invisible light flash just prior to and during the image capture "scan" function such that the invisible substrates reflect their brightest practical illumination. FIG. 5 depicts the bounce flash feature for the invisible ink embodiment.

Figures 10, 11:
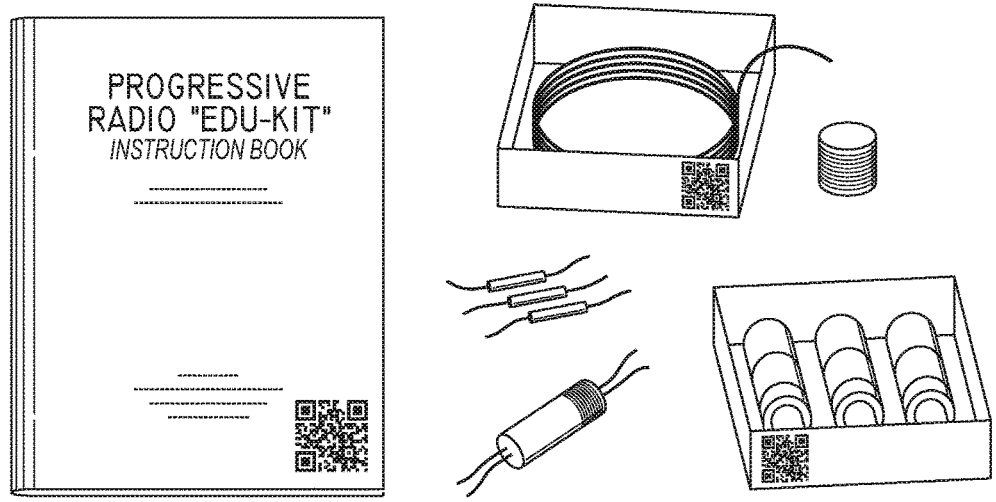
FIG. 10 depicts a manufactured item for consumer assembly embodiment.
FIG. 11 depicts how the visual cipher works.
Figure 13:
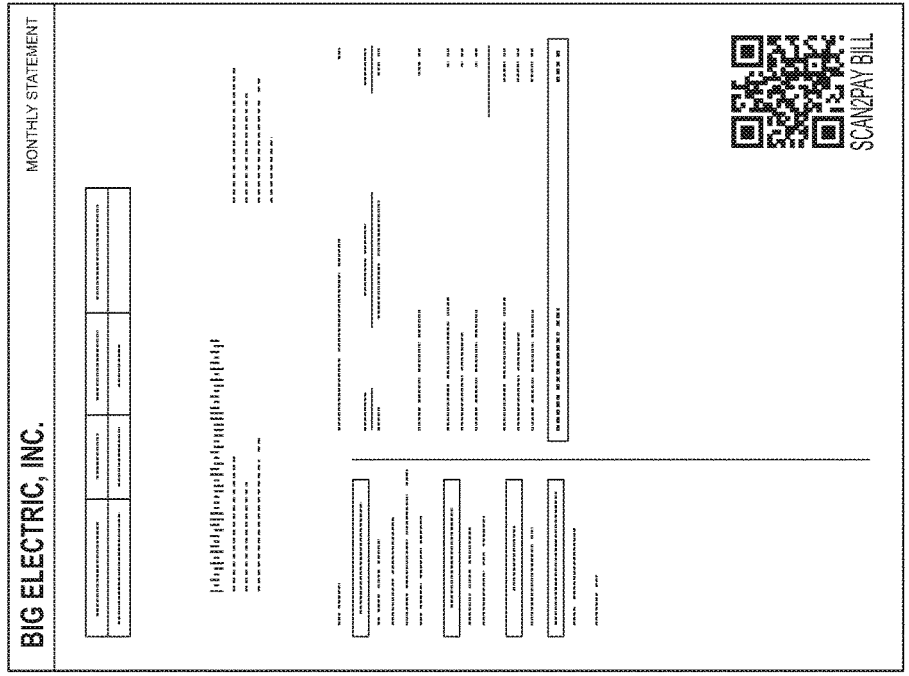
FIG. 13 illustrates an invoice that can be used in the method of FIG. 12.
Figure 12:
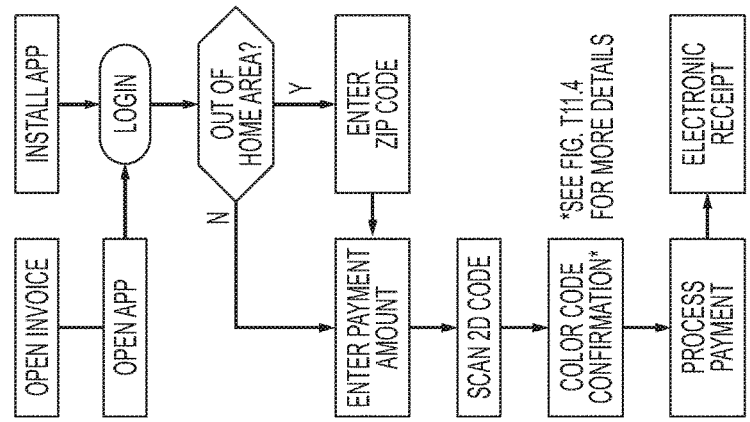
FIG. 12 is a flow chart illustrating a bar code based invoice payment method.
Figure 14:
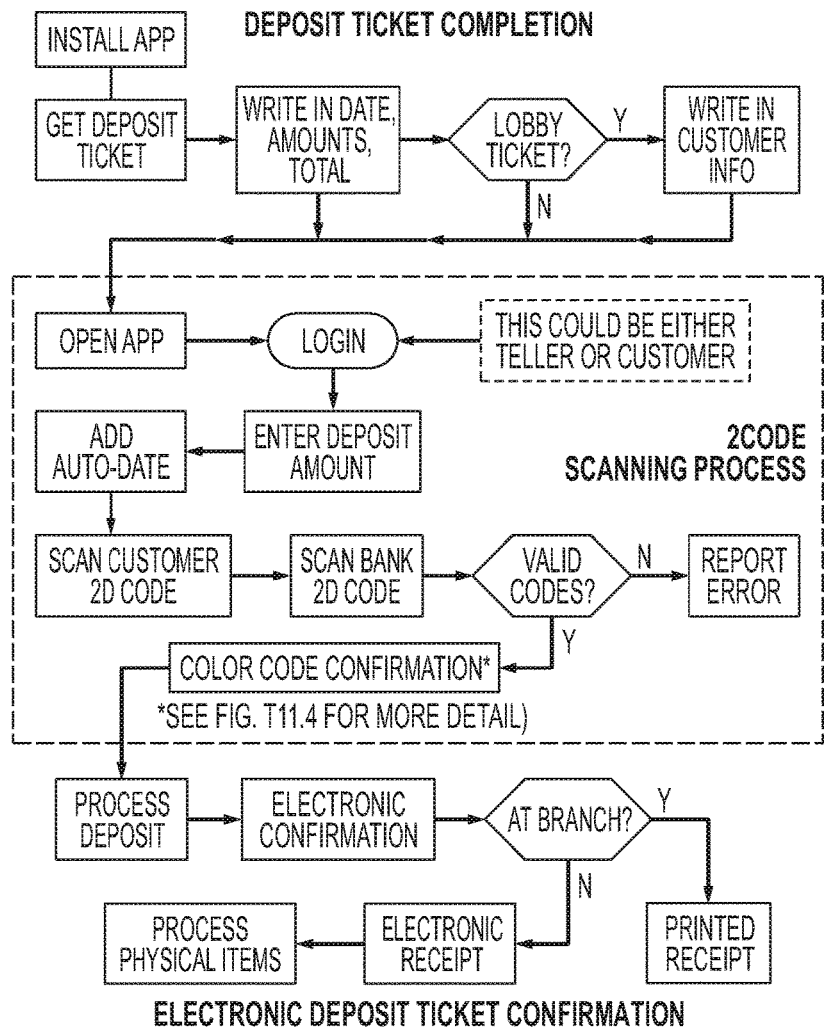
FIG. 14 illustrates a bar code based bank deposit method.
Figure 15:
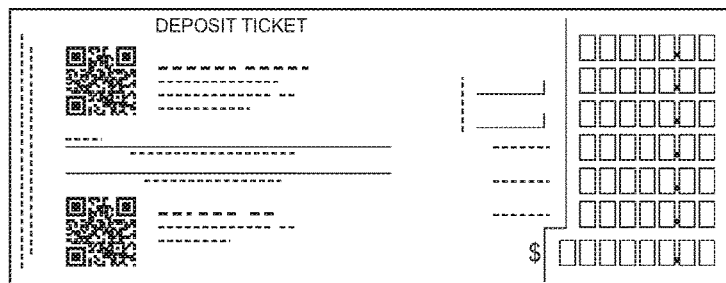
FIG. 15 illustrates a deposit slip that can be used in the method of FIG. 14.
Figure 16:
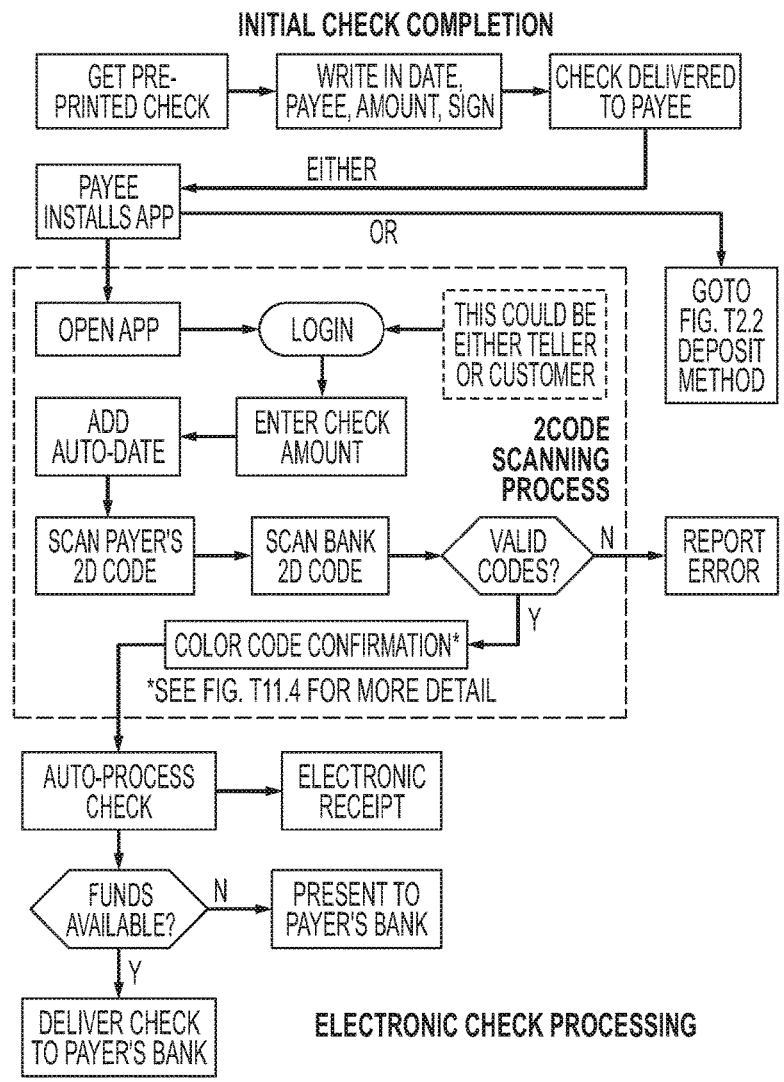
FIG. 16 illustrates a bar code based check payment method.
Figure 17:
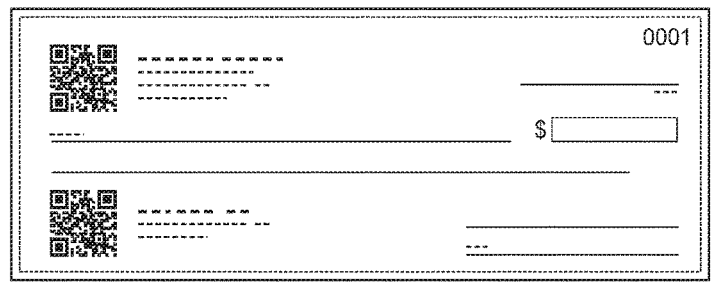
FIG. 17 illustrates a check that can be used in the method of FIG. 16.
Figure 18:
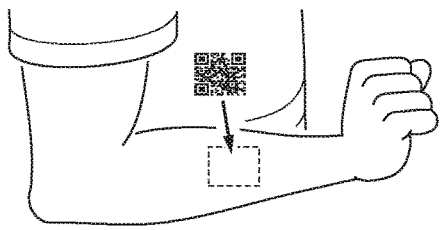
FIG. 18 illustrates application of a bar code to a human appendage.
Figure 19:
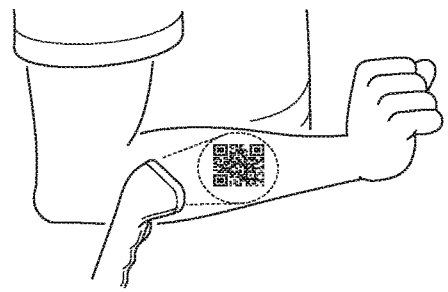
FIG. 19 illustrates reading a bar code applied as in FIG. 18.
Figure 20:
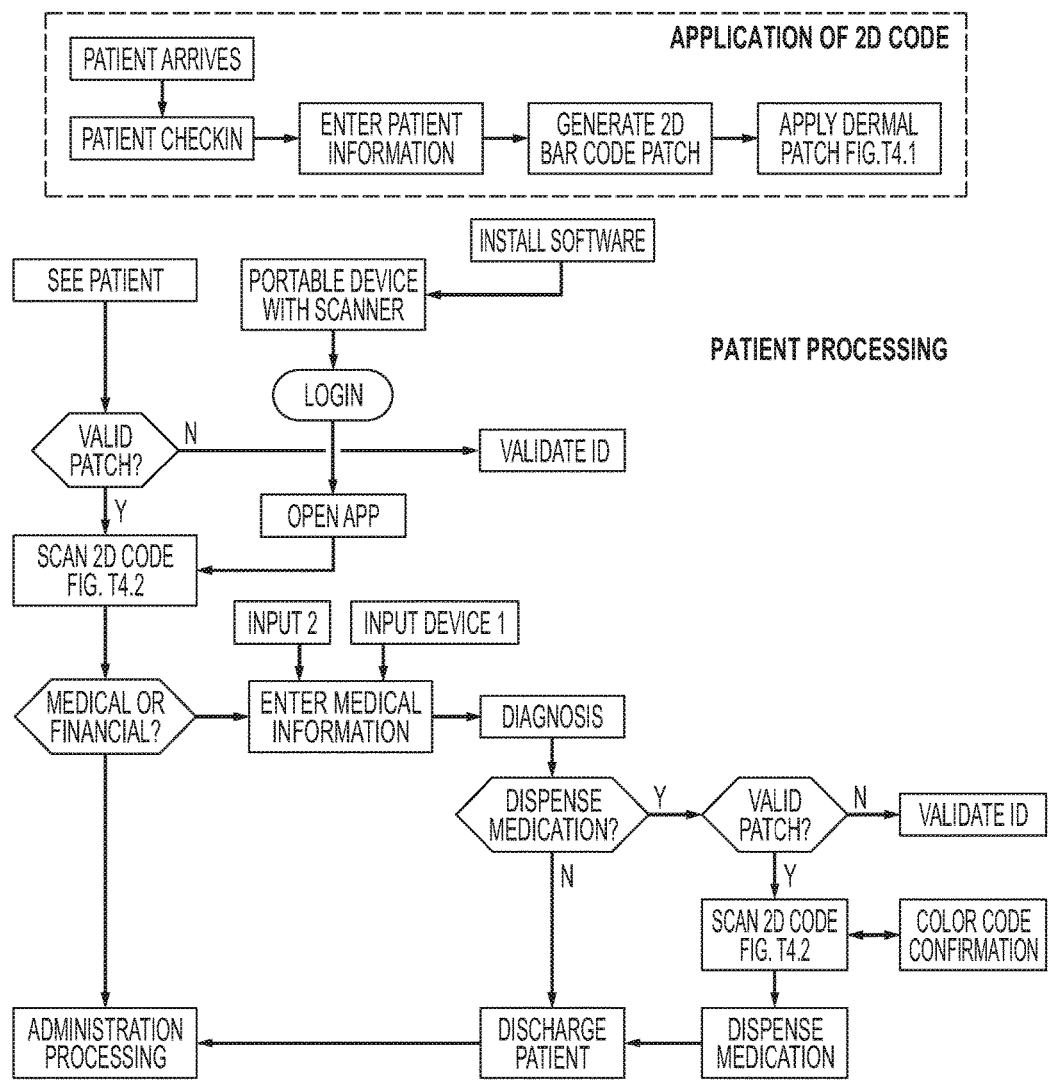
FIG. 20 illustrates a method for conducting bar code based patient management using the bar code applied and read as in FIGS. 18 and 19.
Figure 21:
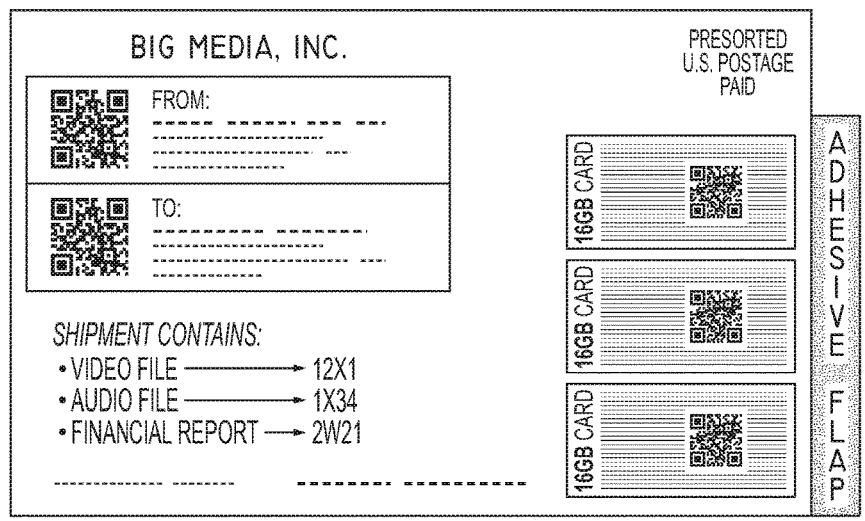
FIG. 21 illustrates a label that can be used in a method for bar code based document mailing.
Figure 22:
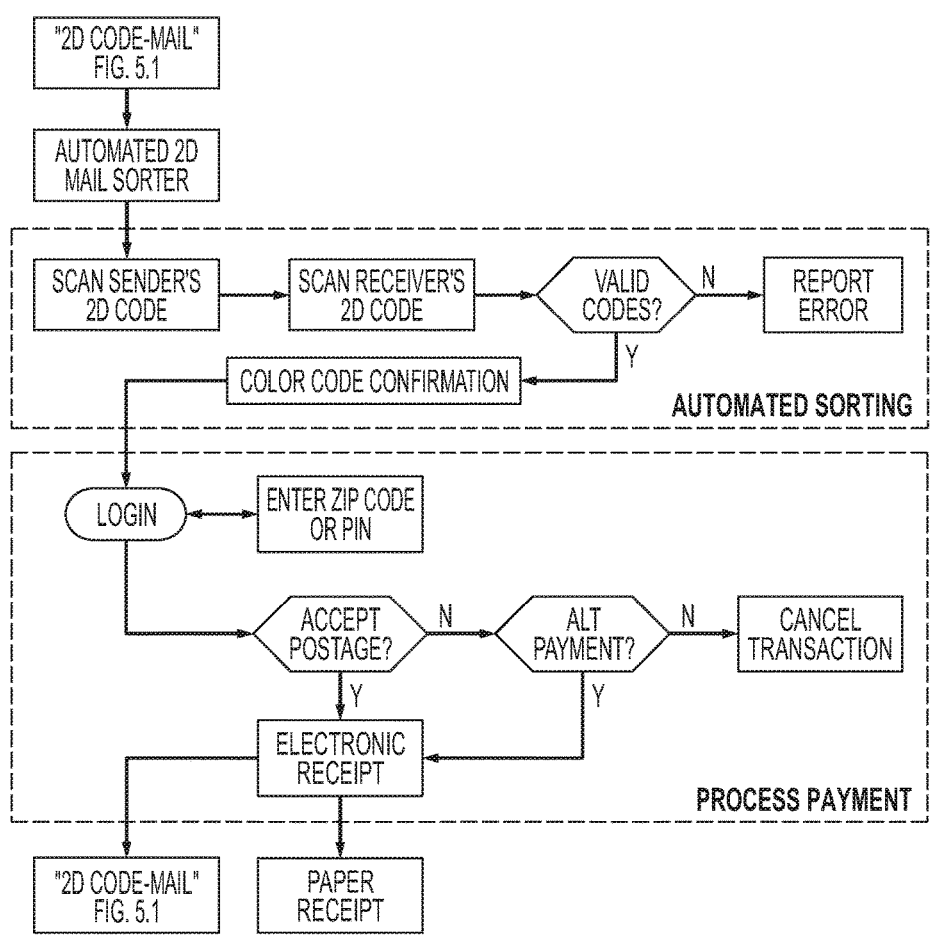
FIG. 22 illustrates a method for processing mail carrying a label as in FIG. 21.
Figure 23:
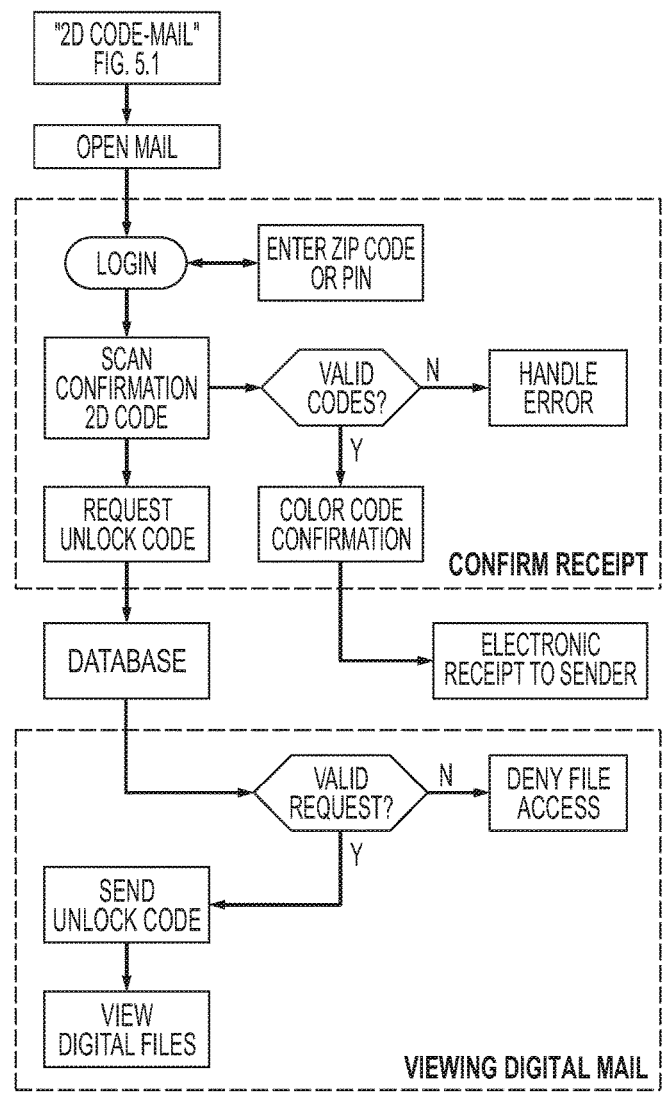
FIG. 23 illustrates a method for receiving mail carrying a label as in FIG. 21.
Figure 24:
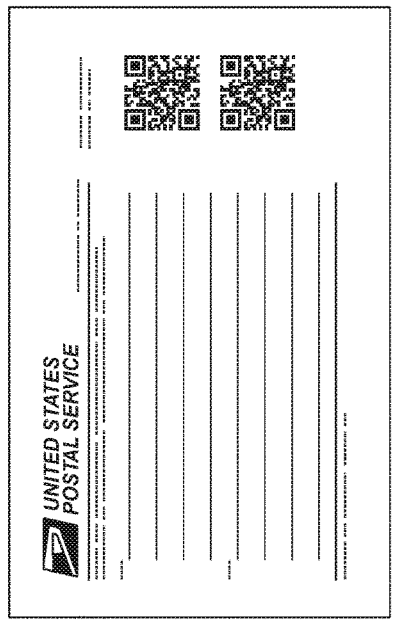
FIG. 24 illustrates a method for preparing and processing a mail label using a form label as in FIG. 25.
Figure 25:
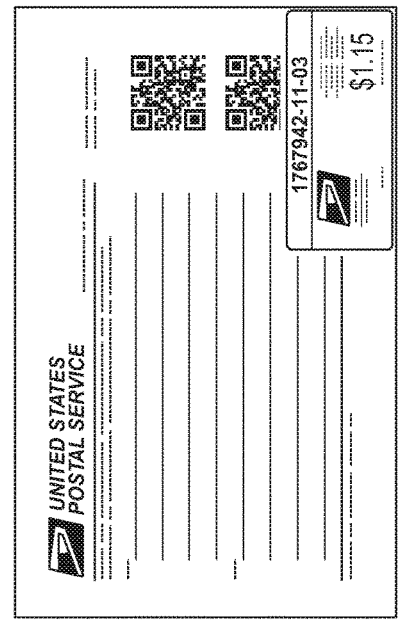
FIG. 25 illustrates a form mailing label.
Figure 26:
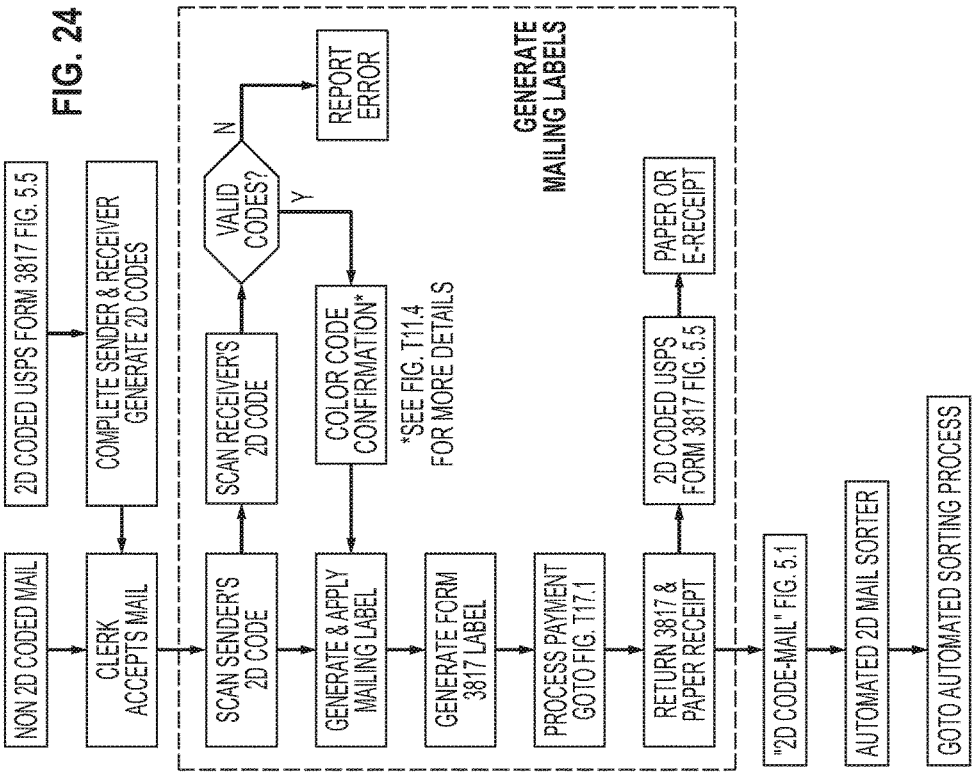
FIG. 26 illustrates a form mailing label with postage.
Figure 27:
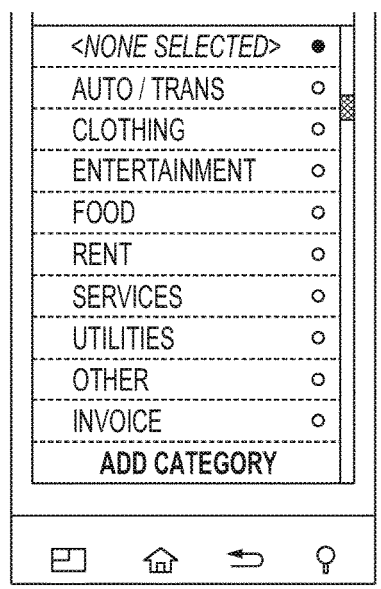
FIG. 27 illustrates a computerized display useful in a method of bar code based accounting.
Figure 28:
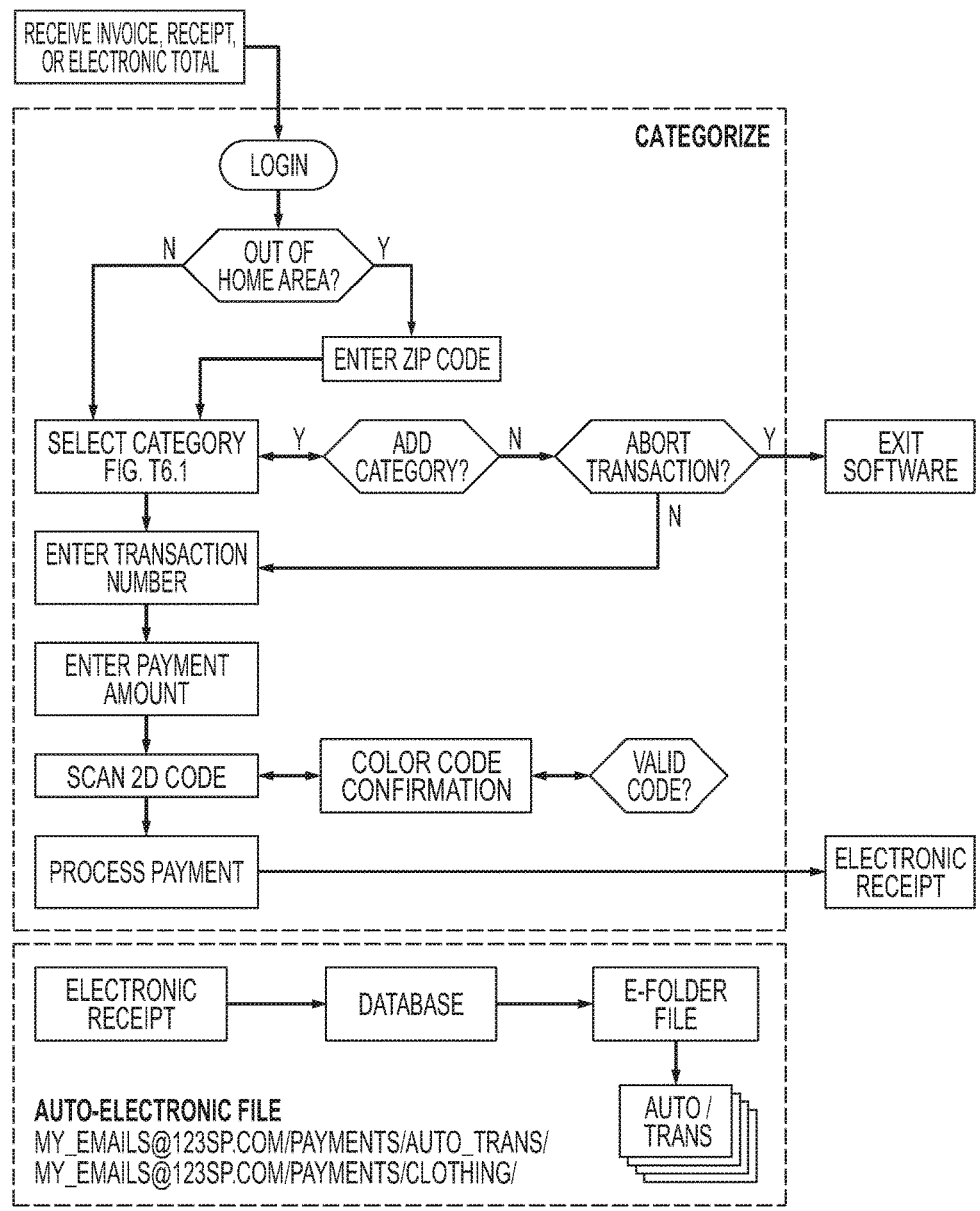
FIG. 28 illustrates a method for carrying out bar code based accounting.
Figure 29:
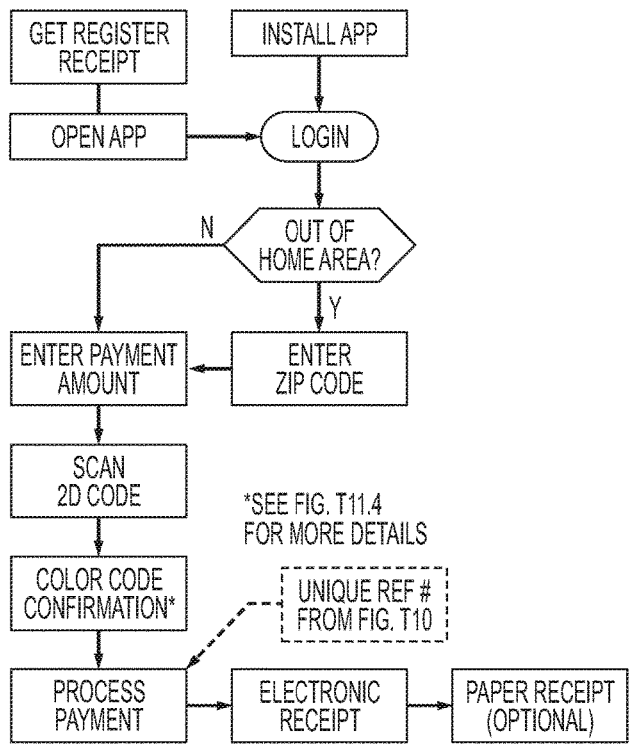
FIG. 29 illustrates a method for carrying out a bar code based payment method.
Figure 30:
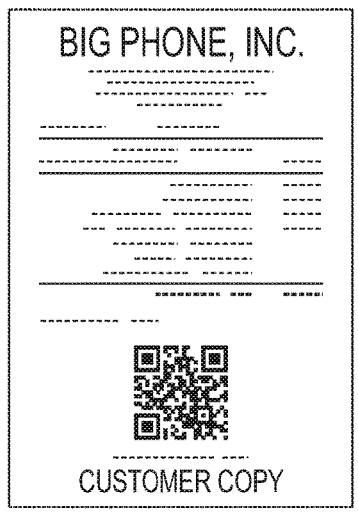
FIG. 30 illustrates a receipt that can be prepared using the method of FIG. 29.
Figure 31:
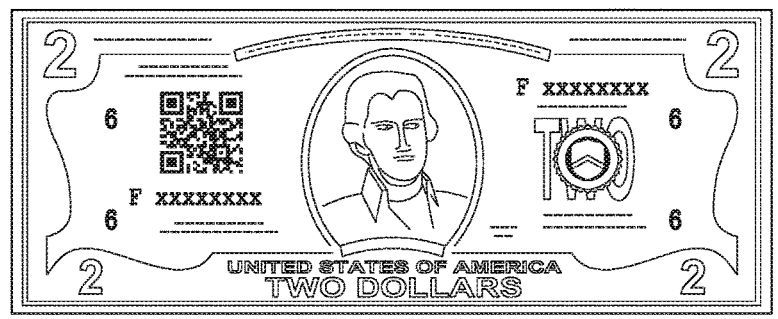
FIG. 31 illustrates a method for carrying out a bar code based anonymous payment.
Figure 32:
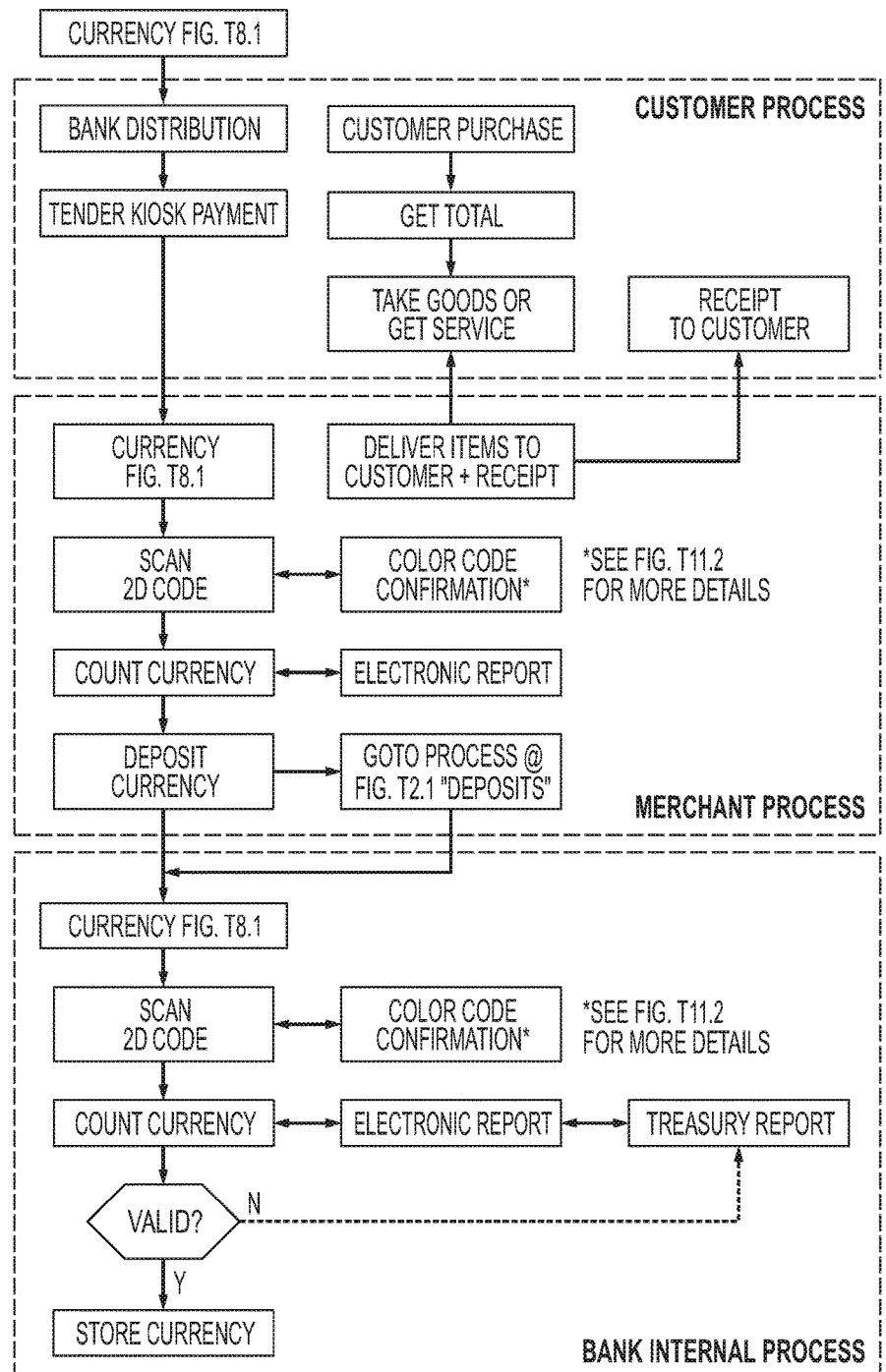
FIG. 32 illustrates a currency for use in the method of FIG. 31.
Figure 33:
FIG. 33 illustrates a front side of a gift card having a bar code.
Figure 34:
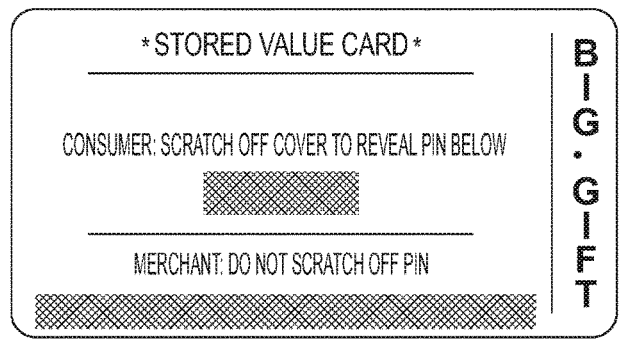
FIG. 34 illustrates a reverse side of the gift card of FIG. 33.
Figure 35:
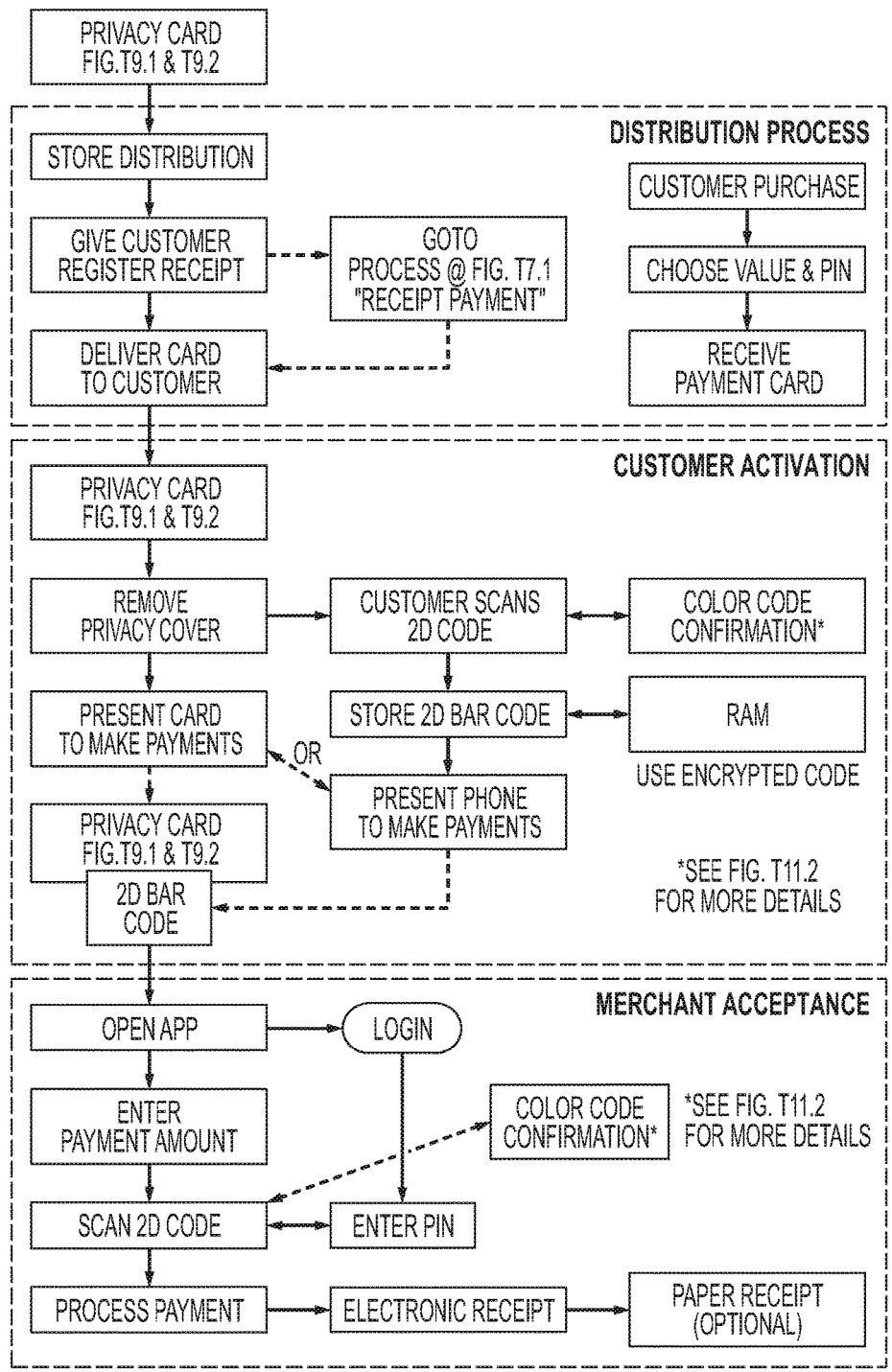
FIG. 35 illustrates a bar code based private payment method that can use card of FIGS. 33 and 34.
Figure 36:
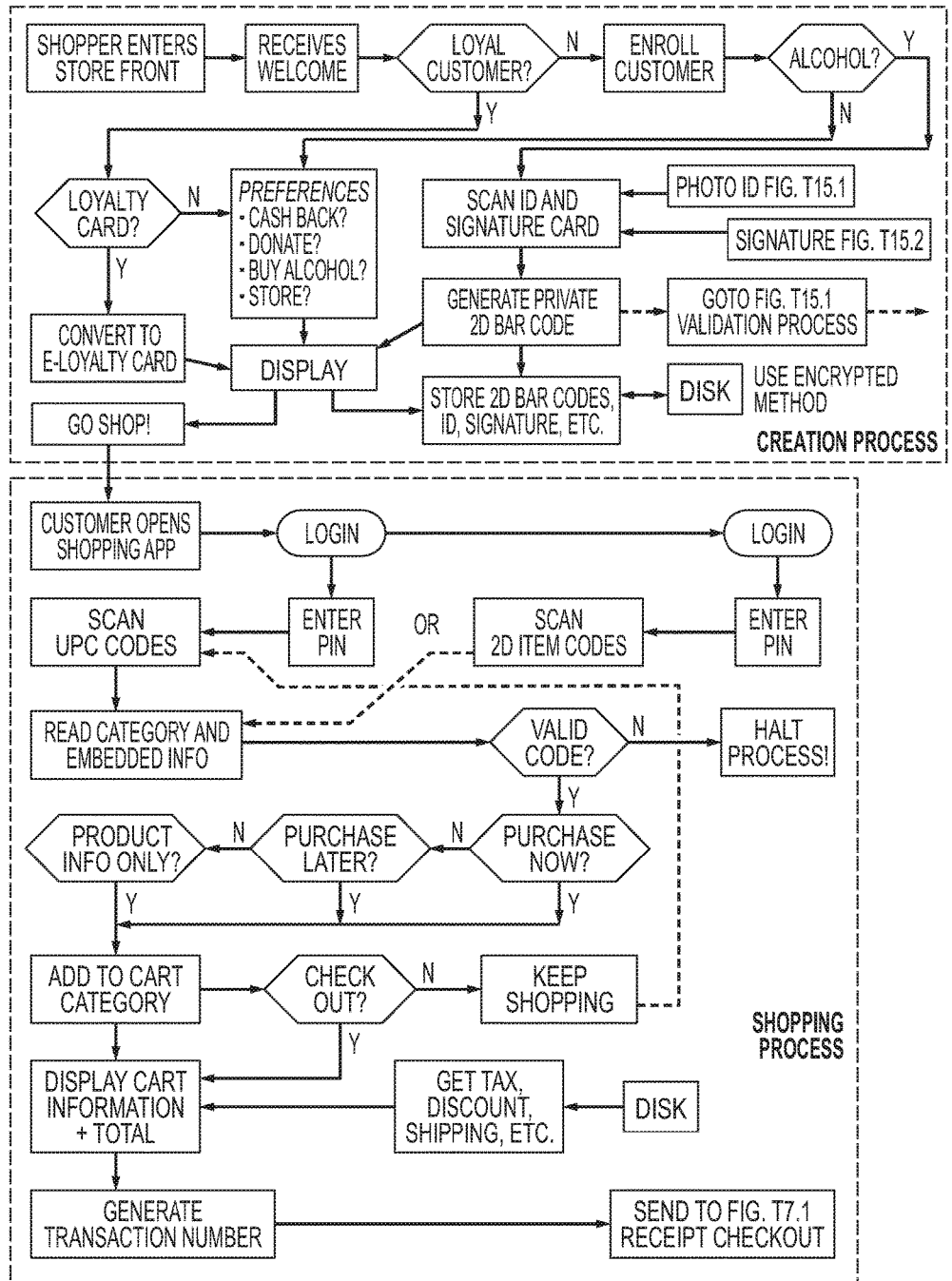
FIG. 36 illustrates a bar code based electronic shopping method.
Figure 37:
FIG. 37 illustrates a color based bar code hierarchy.
Figure 38:
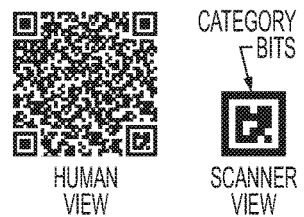
FIG. 38 illustrates a portion of the hierarchy of FIG. 37 in greater detail.
Figure 39:
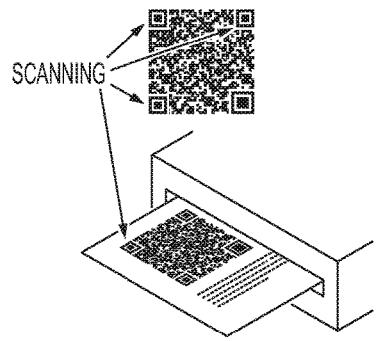
FIG. 39 illustrates scanning a bar code as in FIG. 38.
Figure 40:
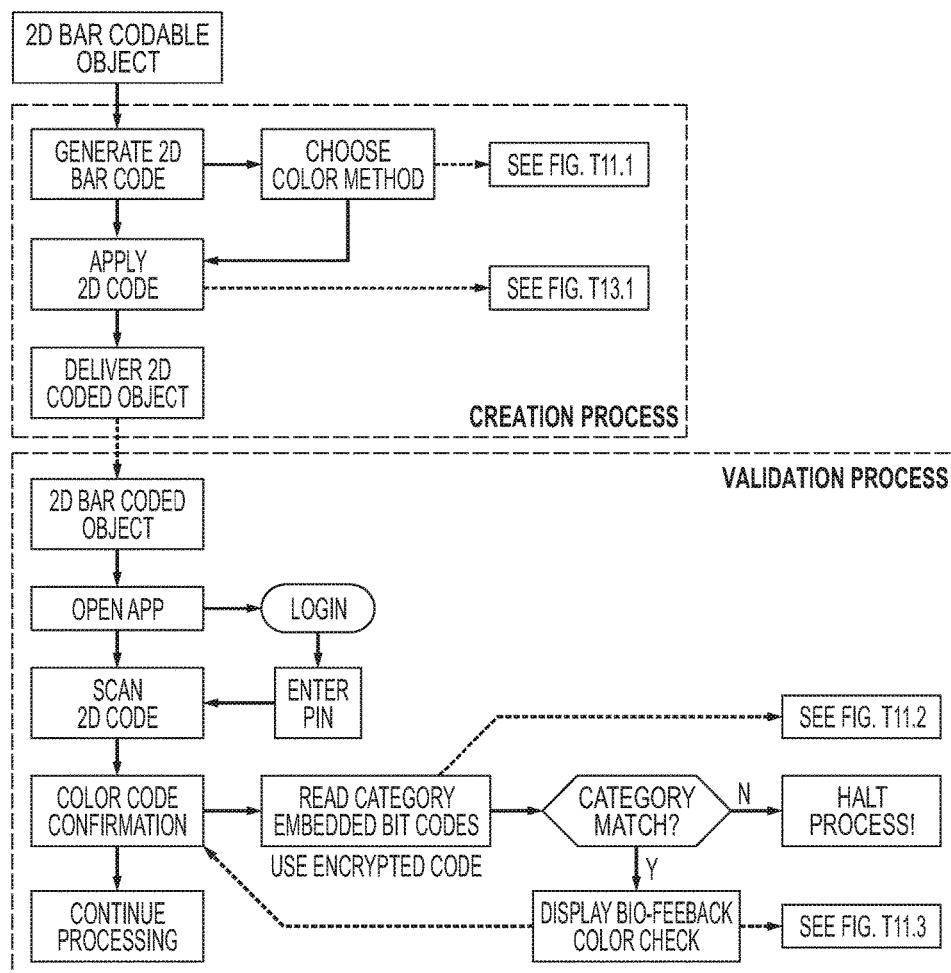
FIG. 40 illustrates a color based bar code hierarchy method.
Figure 41:
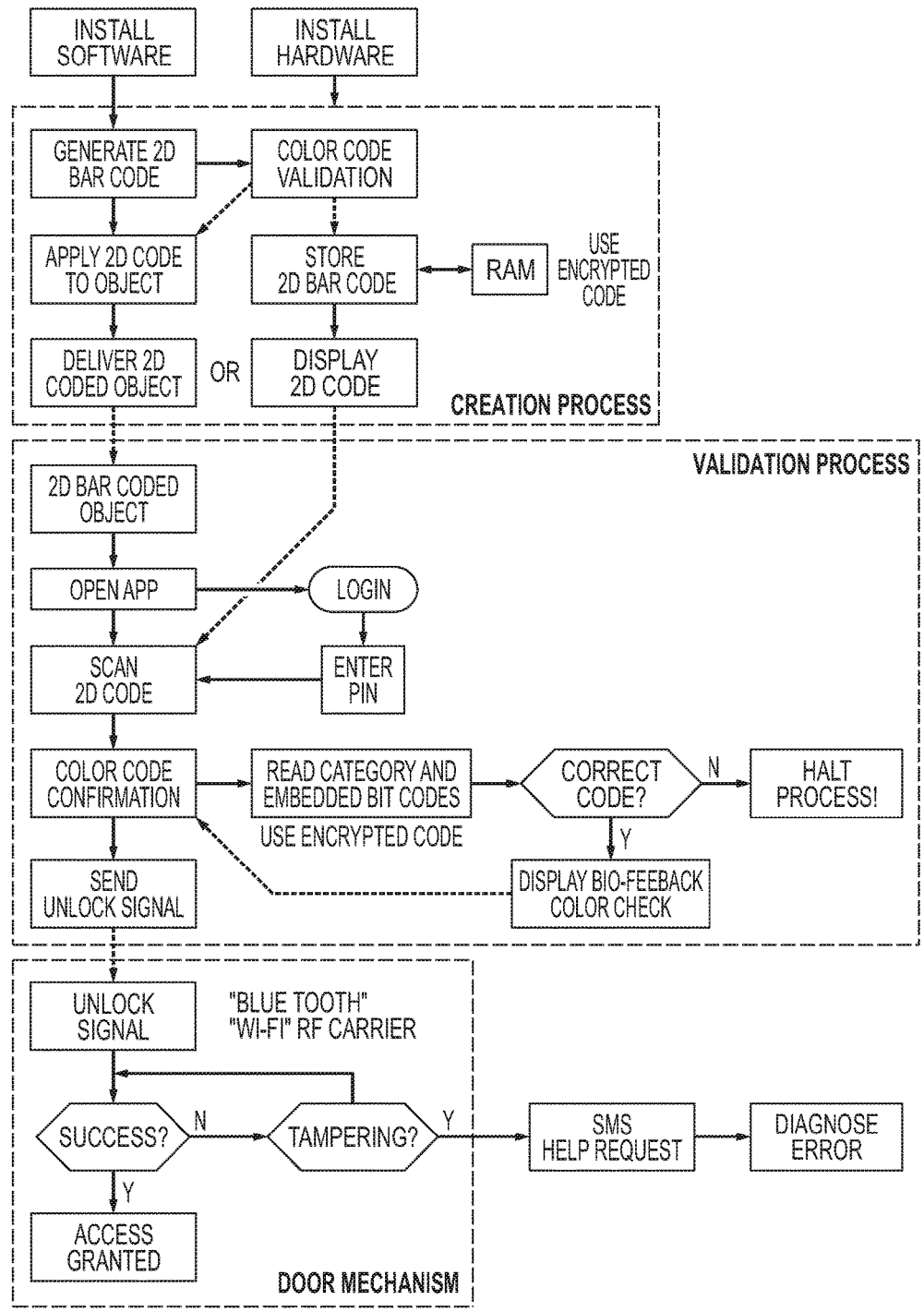
FIG. 41 illustrates a bar code based door entry method.
Figure 42:
FIG. 42 illustrates a vehicle license plate useful in bar code based registration method.
Figure 43:
FIG. 43 illustrates a vehicle license plate having an attached bar code label.
Figure 44:
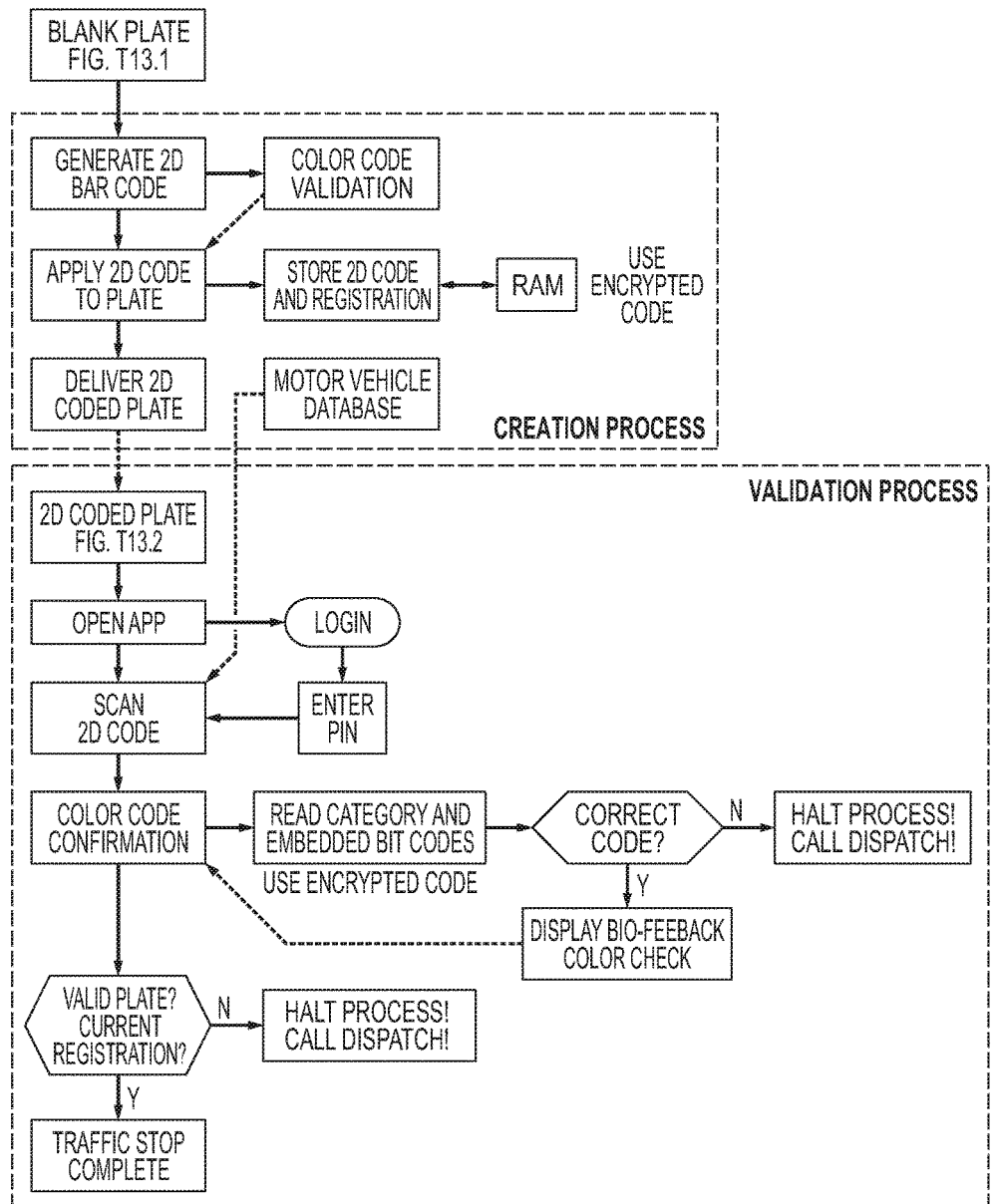
FIG. 44 illustrates a bar code based registration validation method for vehicles.
Figure 45:
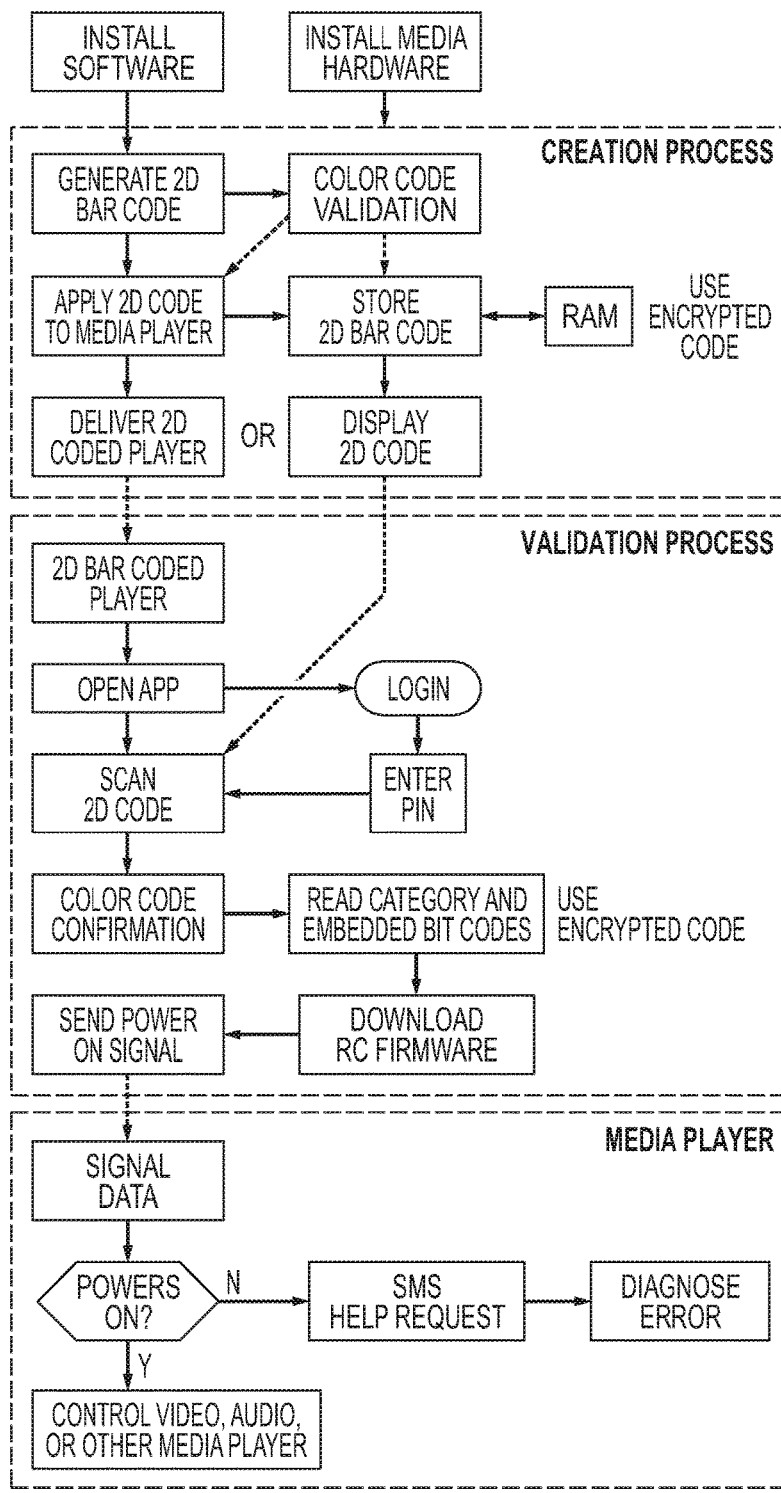
FIG. 45 illustrates a bar code based remote control method.
Figure 49:
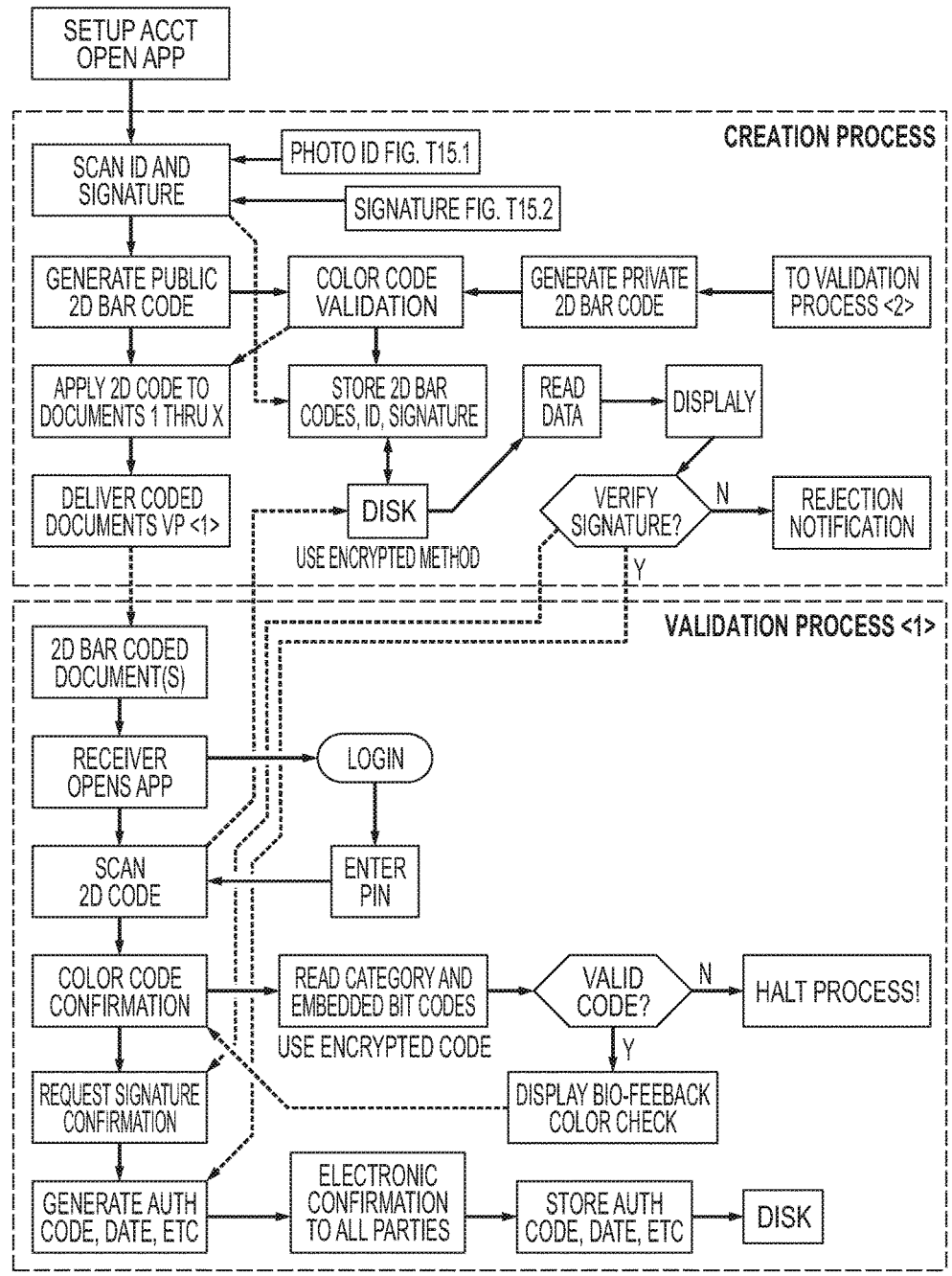
FIG. 49 illustrates a creation method for providing verifiable bar code based signature and cards.
Figure 50:
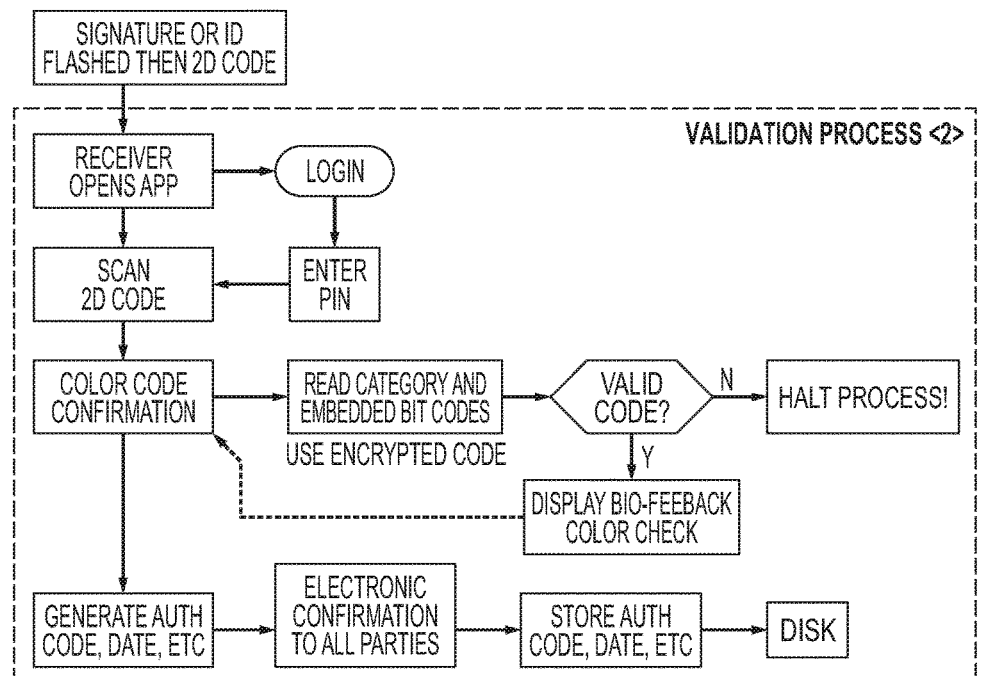
FIG. 50 illustrates a bar code based verification process for cards or signatures.
Figure 51:
FIG. 51 illustrates a young bar code for use in a bar code based temporal security method.
Figure 52:
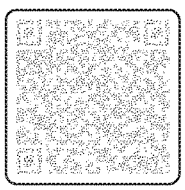
FIG. 52 illustrates a middle aged bar code for use in a bar code based temporal security method.
Figure 53:
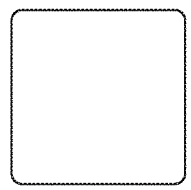
FIG. 53 illustrates an old aged bar code for use in a bar code based temporal security method.

The advantage here is that the 2D scannable codes can be captured under all light conditions independent of the actual natural light conditions, by using an infrared substrate combined with a "flash" attached or embedded into the smart-phone camera either as a replacement or in addition to the current flash used on mobile devices. Where the security concerns are high, the specific "flash" frequency would be kept secret and possibly changed periodically. A preferred security feature in this embodiment would provide that the 2D scannable code would be valid only for a specific time period, either predetermined at the time of the creation of the logo/brand and embedded in the 2D scannable code itself or maintained and selectable through the software in the device which can be "time stamped" at the time of each scan. For example, suppose the registered trademark expired or was otherwise invalid due to non-payment of fees based on a stated expiration period, a scan of the invisible mark by an authorized agent would reveal this anomaly. Likewise, for the expiration of the businesses business license, alcohol license or health permit would be revealed by such a scan. A trusted registrar or franchisor may wish to have a logo expiration period such that if a franchise payment was not timely paid, a logo scan (with the underlying applicable invisible 2D bar code) would reveal this event. Even the software developer for a business specific mobile app may wish to have a specific invisible scannable code frequency to tightly integrate their app with their client's business needs to ensure the mobile device's software is updated or with automated error reporting where a scan error occurs. The manufacturer of the handset (Samsung, LG, SONY and the like) can have an invisible scannable code to collect metrics on the handset scan errors, facilitate firmware updates and the like. The merchant also can have a unique embedded scannable code (albeit on a visible light frequency) so as to facilitate a positive consumer shopping/buying experience. Multiple substrates with multiple "invisible bar codes" are an obvious adaptation of this embodiment. A preferred feature of this embodiment would utilize a bar code image cipher (hashing the image) in combination with bit data channel encryption (128-2048 bits) across a high speed connection such as 3G, 4G, Wi-Max, or Wi-Fi. An example of preferred embodiment of ciphering the 2D bar code image would entail having the mobile device software scan a 2D bar code electronically indexed to a trusted registrar with an master index of all invisible scannable codes contained within a given logo/brand and the appropriate decryption matrix. FIG. 11 depicts how the visual cipher works. With the 2D bar code in mind containing 64 squares×64 squares, the trusted registrar can generate an "open" non-cyphered 2D bar code that can be read by any standard 2D bar code reading software, and then move the sub-squares in an arbitrary pattern such that they were not readable except by virtue of the trusted registrar's software to move the sub-squares back into the "readable" alignment for the various "end users". While the methods described are depicted with 2D bar code embodiments, the information for brand authentication can be contained in a 1D bar code, 3d bar code, or any other type of image that when scanned would yield a numeric data string, and all embodiments herein are not intended to be limited to only scannable 2D bar code images. For example, with the 3D bar codes, imagine a "Rubik's Cube" where the sub-squares are rotated with software from "readable" positions to "non-readable" positions by operation of the software before the 3D bar code image is rendered (either printed or virtually). The steps are reversed by the software to make the 3D bar code image readable—much the same as making each side of a Rubik's Cube appear solid. Though not presented here, other encryption strategies would reasonably be employed as part of practicing this embodiment, but are preferred to be kept as trade secrets rather than publicly disclosed. A preferred feature of the "check-in" embodiment feature as described in my provisional patent application 61/852,108 on pages 25-30 would include a "shopping cart". (See Endnote 1) As noted in patent application U.S. Ser. No. 14/206,628, the scan of the 2D bar code connected to the merchant and specific merchant location would convert the user's smart-phone into a "digital shopping cart" that is digitally displayed on the smart-phone or tablet phone, and integrated into the physical shopping experience custom tailored to the type of merchant or business visited. Once the merchant's unique 2D brand/logo scannable code is scanned, the consumer user can then receive merchant generated "favors" such as: loyalty discounts, promotions, product information, web site information, advertising, etc. This embodiment (with embedded geodesic codes) connects the consumer user to one unique merchant identity and thus enables the content such as loyalty discounts, promotions, and shopping enhancements to be tailored to one specific consumer upon check-in. Preferred features in this embodiment would include: 1. An automated system to "handshake" with incoming consumer's smart-phone triggered by the "check-in" scan, if a first time store visitor, which can either through Wi-Fi, Bluetooth, ultrasonic listening through the smart-phone's microphone, or even infra-red. 2. Once the handshake is cued, an opt-in popup is "triggered" so that the user elects (or declines) to participate and electronically connect to the given merchant, this would enable the process of going from "check-in" to the shopping experience in a seamless manner. 3. Database retention of the consumer user's profile, shopping experience preferences, visits, loyalty points, and the like. 4. Integrated scanning of Universal Product Codes (typically 1D scannable codes) to enable consumers to gain information about products. 5. In-store shopping/browsing app either written in native code or written to support mobile interaction using the HTML5 methodology. 6. Ability to select items and add to virtual shopping cart while simultaneously adding to a physical shopping cart, such that when an item is added to a physical shopping cart it is also electronically noted on the virtual shopping cart. 7. Ability to instantly download coupons, or other promotional bonuses such as free songs, photos, etc. during the shopping experience. In the case of the coffee shop example, the "check-in" causes the coffee shop "menu" to appear in the mobile device's browser window and enables the user to select the type of coffee he or she wishes, and any other treats. Since this user frequents this coffee shop, a 10% loyalty bonus is given as a scannable coupon, which the user downloads, and displays to the barista at the point of sale terminal who scans it with her scanning device as part of the point of sale payment process. 8. Automated help and informational screens would "pop up" and enable real time and/or contextual help should the user have questions or concerns about a particular product or service. This can include video chat with a product or store representative, either locally or remotely.

As I previously noted in U.S. Ser. No. 14/206,628, the brand/logo authentication facilitates a comprehensive "manufacturer to merchant inventory control system". This feature is depicted by considering accounting and inventory control side of the coffee shop merchant example, where the bottom side of the coffee cup contains a 2D bar code that, when scanned by the merchant (or consumer if self-checkout is permitted), notifies the coffee cup manufacturer or vendor that the one inventory item (e.g. the cup) has been sold or otherwise used. However, the embodiment herein adds the feature of a brand registry that includes a "check-in" at the cup manufacturing facility which creates a database table with a date and geo-origin of manufacture entry, with updated entries, logged by re-scan at various checkpoints as the manufactured cup is boxed and shipped to ultimately reach the specific retail location. In this instance, say the cup is shipped from China. The cup has a 2D bar code on the bottom of the cup, a matched 2D bar code on the packing materials, and even matching the shipping documents. The manufacturer scans the 2D bar codes to log the items out for shipping, and the shipping company scans the matching codes upon receipt and re-delivery to a wholesale company, who follows the same procedure, U.S. Customs (or other government's customs) scans the shipping docs, and can scan the packaging down the specific cups on a test basis to confirm the quantity and authenticity of the shipment. The wholesale company delivers to the regional distributor, who in turn delivers the cups to the specific retail store. A store manager, can then scan the bottom of the cup and view the "pedigree" of the shipment, thereby confirming the date, time, and location of each step from the manufacturer of origin to his retail shop. Law enforcement personnel can scan the cup bottoms, and compare the shipping pedigree to the trusted brand/logo registrar records to confirm the logo/branded item's manufacturing origin for reasonableness. As I also describe in patent application U.S. Ser. No. 14/206,628, this embodiment or the other embodiments herein can include bar codes that rapidly fade (minutes or hours) to prevent reusing the same cups at a later time.

As I describe in patent application U.S. Ser. No. 14/206,628, a preferred feature further included in this embodiment would link the inventory control 2D scannable code to a database that includes printing the unique logo/brand+2D manufacturer of origin scannable code on the check out receipt as described in PPA 61/852,108 on pages 13-15. See Endnote 2. As described in patent application U.S. Ser. No. 14/206,628 this feature would enable the consumer to automatically record and categorize the type of expense, based on predetermined criteria such that the 2D bar code contains a suggested expense type considering whether a given expense is for business or personal consumption, in the form of an appendable drop down list or pop-up input box. However, the embodiment here goes further in that a scan of the 2D bar code can enable the consumer to trace the items pedigree from manufacturer of origin to the retail store to ensure the logo+2D bar code seemed reasonable. Moreover, in case of adulteration of a manufactured item, the consumer can trace an item's movements. Additionally, counter-fit items can be rather quickly spotted as the "pedigree" wouldn't match the actual events or can be non-existent.

As I describe in patent application U.S. Ser. No. 14/206,628, the "check-in" embodiment includes an "integrated payment method" as described in PCT/US2011/00855 wherein the consumer scans a label stick or even the bottom of the cup itself containing a 2D bar code to pay for the coffee (which contains the merchant identity information with or without the geodesic code), enters the amount (or the amount is embedded in the 2D bar code), and the consumer's bank "pushes" the money to the merchant's account. Variations of this embodiment feature, which can enhance systems of internal control for the merchant, can include printing the 2D bar code on the register receipt which is then scanned by the consumer as described in PPA 61/852,108 on pages 15-17 (See Endnote 4) and the consumer's bank once again "pushes" the money to the merchant's account, or printing the 2D bar code on an invoice which is then scanned by the consumer as described in PPA 61/852,108 on pages 1-3 (See Endnote 5) and "pushed" the same way, or even paying the merchant with a check as described in PPA 61/852,108 pages 6-8, wherein consumer's personal information, account information, and bank information are contained on a preprinted check (See Endnote 6). As part of the feature to accept a check payment, the merchant prints their own information on the check (preventing transaction re-use), the consumer confirms the transaction information such as check number and payment amount on their mobile device display, and the consumer's bank once again "pushes" the money. A key advantage of this type of integrated payment feature (with inclusion of geodesic code)

is that "out of area" transactions can be more closely scrutinized, and consumer buying trends can be tracked with great precision.

As I describe in patent application U.S. Ser. No. 14/206,628, in an alternative embodiment depicting "turn by turn directions", the merchant can, in advance, cause a 2D bar code to be sent to the user for the purposes of navigating in the first instance to the merchant's location. This embodiment contemplates the merchant sending the 2D bar code to the user and the user taking a "digital snapshot" of the 2D bar code previously sent by the merchant, which would contain the numeric geodesic code, the software would determine user's current location through currently used GPS methodology, then resolving the scanned geodesic code containing the merchant's corresponding geo-location information, generate exact turn-by-turn directions to the merchant's location. The 2D bar code can either be sent via postcard with an attached label, sticker, temporary tattoo, or can be sent electronically to the user's email and then scanned by the user's smart-phone from an electronic screen display on a desktop, laptop, or tablet computer. While a "virtual" 2D bar code can be sent to the user's mobile device directly, and scanned virtually, or even the raw geodesic code number emailed or texted to the user so that it can be entered manually, or populated from a linked database, neither would be the preferred embodiment as depicted herein.

As I describe in patent application U.S. Ser. No. 14/206,628, in a second embodiment (as described in PPA 61/852,108 on pages 10-13, (see Endnote 7), a "post card" embodiment is depicted by the example of the merchant desires to send out a post card mailing to the user's home address which, in addition to the advertising content, contains a scannable 2D bar code printed on the card, or a label, or sticker that includes the merchant's name, address, and a corresponding geodesic code. Assuming the consumer user wishes to visit the merchant's store, he or she scans the 2D bar code that contains the merchant's contact information, including the geodesic code. As in the generic example above, the user then obtains turn-by-turn directions to the merchant's store. But in this case, the merchant's contact information (which includes the geodesic code) can be stored in the user's phone "directory" as a numeric string prior to traveling to the merchant's store. Though the geodesic code can be simply appended to the existing "directory", a more eloquent solution is to have a "geo-directory" such that the directory contains merchant's in a specified geographic area, which changes depending on the user's location (most likely embodied with a region code as described in Luger). Such a directory can be pre-populated with merchant's contact/geo-contact information linked to the specified geo-numeric region code or it can be embodied such that merchants are populated when scanned or a combination of both. In the preferred embodiment, sufficient consumer identification information is embedded in the 2D bar code so that when scanned, the merchant receives metric data identifying when the consumer viewed the post card. This embodiment can include having the consumer's device register the consumer's geo-location when the code is scanned, but this step can also be eliminated to protect consumer privacy.

As I further describe in patent application U.S. Ser. No. 14/206,628, the $2^{nd}$ "post card" embodiment would provide that when the scannable 2D bar code (containing the geodesic code) is scanned in proximity to the local post office or postal box just prior to depositing in the postal box, wherein the merchant's smart-phone contains software that is linked to the post office database, and follows the delivery processing from the starting post office or deposit into the box to where the item is initially deposited through to the ending post office—where the posted item is notated as "out for delivery" to the consumer recipient. Another preferred feature of this embodiment would once again use the "check-in" feature described above, wherein the post office patron scans the post office's 2D USPS merchant code, which then triggers the post office shopping experience to occur on the patron's smart-phone. Once the check-in occurred, additional preferred features can include: 1. An automated pop up to enable the user to purchase stamps at an Automated Postal Center (or similar kiosk) and pay for the stamps using their smart-phone. 2. An integrated media pouch to enable the merchant to send micro digital media such and SDS card with the post card in instances where digital delivery can replace physical pages. 3. Step by step directions to help the postal patron deposit the package in such a way to facilitate tracking as described herein.

As I further describe in patent application U.S. Ser. No. 14/206,628, in an alternative of the preferred $2^{nd}$ "post card" embodiment, the embedded scannable 2D bar code itself functions as an onsite printed postage stamp which contains a unique serial numbered sequence, a stamp denomination (or exemption flag if the value is perpetual), and a point of origin geodesic code. This 2D bar-coded "stamp" enables anonymous tracking of the item based on the stamp's unique serial number alone which facilitates specific tracking while keeping the specific identity of the sender and receiver anonymous to preserve privacy. In this embodiment, the package carrier, would have to have scanning software on a tablet or other mobile device to be able to scan the item at each sorting/and handling point. Such an embodiment can be implemented by the postal or other common carrier in such a way as to enable anonymous "lookup" of the postcard/letter/or packages tracking by the unique serial number. This embodiment is similar to that practiced by the U.S. Postal Service currently, wherein scannable codes are used, except that in the later case the scan is not linked to a calculated geospatial location, but rather the 2D bar code is linked to a "facility" address recorded in an address table. The advantage of the embodiment presented here is that a GPS calculated location makes it easy to adapt "ad-hoc" mail processing facilities with the user of simple smart-phones or tablet mobile devices, and eliminates frequent updating and facility locations, open, close or change. Though not considered a preferred embodiment, the scannable 2D bar code can omit the origination geodesic code such that the "location" was calculated using GPS methods at each point of scan, but generating a physical stamp at the origin location better facilitates the "inventory tracking" process as described above for the coffee cup. A preferred embodiment feature (where privacy was less critical) would (in addition to the unique serial number and point of origin geodesic code) include a unique identifier in the 2D scannable code containing the recipient's geodesic code corresponding to their physical address (with or without additional addressee information embedded therein). With this embodiment, the "delivery" function can be automated such that when the delivery person physically arrives at the recipient's location, the software in the smart-phone, or mobile table device records a delivery. Though not considered a preferred embodiment, a recipient can require the delivery person to also "check-in" by scanning a 2D bar code at the residential location (as would be done where they check-in at a merchant location) where additional delivery verification is desired.

As I further describe in patent application U.S. Ser. No. 14/206,628, in a third embodiment (as described in PPA 61/852,108 on pages 10-13, see Endnote 7), a "hospital" embodiment is depicted to illustrate the utility of the invention in an institutional setting where the resident population needs to be more closely monitored. While all the features of the previous preferred embodiments would likely be incorporated into this embodiment, where this embodiment is distinguishable is that here an additional step is added to the "check-in". Specifically, the hospital (or other institution) provides to the patient, visitor, or employee an adhesive sticker, label, or temporary tattoo which contains an image of a scannable 2D bar code that is then applied to a person's appendage or a personal object. Like the method of human identification described in Heeter U.S. Pat. No. 8,483,448, the disclosure of which is incorporated by reference herein, this embodiment is " . . . a method of human identification comprising the steps of providing identity information for a human in an electronic database, providing identifying information for a plurality of marks in an electronic database, each mark being associated with the indentifying information for one person in a validating way for a specific time, and providing a means for transferring marks which convey the indentifying information to a scanner onto their person or a personal object."

The hospital maintains the visitor identity database, obtained at check-in and entered manually or captured when the person performed a "check-in", as was done in the coffee shop. The hospital then prints out the decal or sticker (or more preferably an adhesive dermal patch), which is then applied to the person for use during the time in which the person is at the hospital (See Endnote 15). This embodiment differs from U.S. Pat. No. 8,483,448 in that it adds the geodesic code information to the mark, such that when scans either by the user's smart-phone or tablet computer or by a smart-phone or tablet computer under the control of the hospital or other institution, the device reports back the users location in addition to the other information. A preferred feature of this embodiment provides that the dermal patch would change color upon removal from the patient to prevent accidental removal or tampering. The changing color security feature would make the dermal patch suitable for medication control as an additional function in that dispensation of patient medications would require scanning the patch each time to validate the person's identity within the facility. Another preferred feature is that when the person left a specified geographic area as pre-defined within the geodesic code software functions, the code would not function or register when scanned, such that any internal codes used within the scannable codes cannot be decoded outside the geographic area in the event that such codes were scanned by devices outside the control of the hospital. Like in the generic embodiment, this embodiment utilizes a bar code image cipher (hashing the image) in combination with bit data channel encryption (128-2048 bits) across a high speed connection such as 3G, 4G, Wi-Max, or Wi-Fi, the relatively low bandwidth requirements of this check-in method would permit using a "reverse hash" with or without image cipher across SMS band (with or without band encryption) to scan and send the scanned geo-numeric information in remote rural areas or in case of a broad failure of other available high speed internet channels. While the methods described are depicted with 2D bar code embodiments, the requisite geo-numeric information can be contained in a 1D bar code, 3d bar code, or any other type of image that when scanned yields a numeric data string, and all embodiments herein are not intended to be limited to only scannable 2D bar code images. Moreover, though depicted using visible scannable images, the scannable images can be comprised of light frequencies within human optical ranges, outside human optical ranges or a combination of both. Like in the merchant example above, preferred features in this embodiment include a "patient management cart" where all services received by the patient would be linked to the specific bar code "patient token", and would include the integrated inventory management, receipt tracking and integrated payment methods.

As I further describe in patent application U.S. Ser. No. 14/206,628, in a fourth embodiment and as described in PPA 61/852,108 on pages 17-25, an "anonymous payment" embodiment is depicted to illustrate the utility of the invention to facilitate anonymous payments (See Endnote 8). As previously described above where the embedded scannable 2D bar code functions as an onsite printed postage stamp which contains a unique serial numbered sequence, a stamp denomination (or exemption flag if the value is perpetual), and a point of origin geodesic code. However, this embodiment functions the same for bearer stamps, money, or gift cards (another bearer payment method). As with stamps, the money or gift card contains a unique serial numbered sequence, a denomination, and a point of origin geodesic code. The intent of this method is not to facilitate real time tracking, but rather "check point" tracking when the stamp, money or gift card comes into control of a bank teller or ATM, merchant that does bill validation, automated vending machine or the like. The merchant, ATM, or other checkpoint relies on the authentication of the physical specimen (money, stamp or gift card) rather than requiring the person to self identify. Though a merchant who is suspicious of a stamp, bill or gift card can require additional identification, it is not the preferred method. The 2D bar coded bill, stamp, or gift card enables anonymous tracking of the item based on the item's unique serial number alone which facilitates specific tracking while keeping the specific identity of the parties anonymous to preserve privacy. In this embodiment, the merchant, ATM, teller, or other trusted handler would have to have scanning software on the ATM, desktop with scanning wand, tablet or other mobile device to be able to scan the item at each handling point. Such an embodiment can be implemented by the treasury department, gift card issuer, or postal service to facilitate anonymous "lookup" of the item to rule our forgeries (e.g. duplicates, or out of the correct sequence, etc). The advantage to this embodiment is that is enables voluminous, yet quasi-anonymous metrics of ATM use, stamp purchases, gift card use, and the like, connected to the calculated geospatial location. Though not considered the preferred embodiment, the scannable 2D bar code can omit the origination geodesic code such that the "location" is calculated using GPS methods at each endpoint scan, but retaining a physical origin location better facilitates the "inventory tracking" process as described above for the coffee cup. In this case, when money is delivered to the bank, the geodesic codes can be scanned, to ensure that all actually arrived at its correct destination. The embodiment presented offers a more reliable method of currency control because software for scanning currency, gift cards or stamps can be developed for both treasury agencies and the consumers to facilitate co-monitoring of currency, with levels of access being provided as appropriate, since scanning the bar code can will yield a single unique data string. One example of a metric available to the public would be to a bill's movement history to give the recipient reassurance that the bill in question is "in circulation" as depicted by the website "www.whereisgeorge.com".

Likewise, "inventory" management of the distribution of bills is facilitated, and monitored in the same fashion as described in the coffee cup example embodiment. A preferred feature of this embodiment would be to facilitate remote deposits through automated optical validation of bills the same way that checks can be scanned and deposited by banks currently.

Figure 6A:
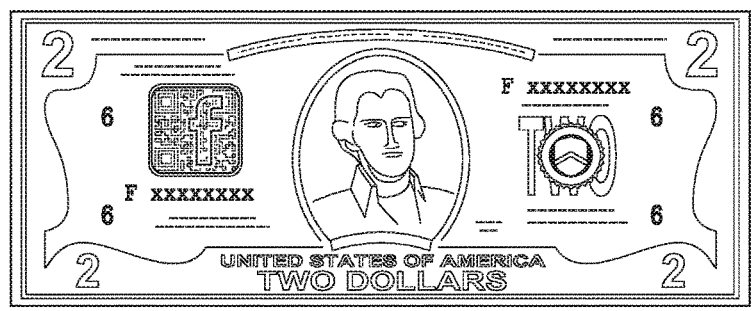
FIGS. 6A and 6B depict the currency embodiment of the invention.
Figure 6B:
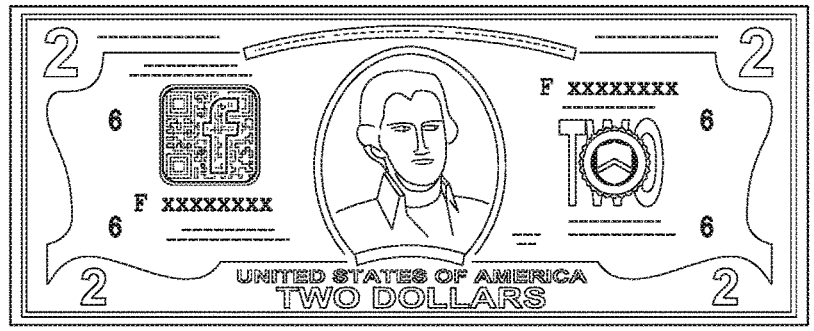

FIGS. 6A and 6B depict the currency embodiment of the invention. The embodiment presented in this application depicts currency authentication prior to circulation, whereby an image of a 2D bar code or other scannable image, which yields a data string is presented, together with a physical specimen of the currency or stamp to create a "scannable currency", which contains encoded identity data for the currency or stamp, encoded visual identification characteristics for the currency or stamp denomination, and encoded GPS data corresponding to government printing office location for a printed item. The image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information matching the address coordinates or geo-coordinates of a treasury facility, correspondent banking facility, wholesale facility, distribution facility or retail banking location. If the decoded information is a geo-proximal match, an authentication application is launched in the computer function of the mobile communication device. The authentication application has certain required fields, which include time and date that the mobile device scans the scannable currency to effect authentication, which are automatically populated each time the authentication application is launched. Additionally, when the authentication application is launched subsequent to the initial launch at the government printing facility and if the decoded identity data for the logo paper currency or stamps, decoded visual identification characteristics for the currency or stamp denominations, and decoded GPS data are successfully matched against a registry database for validity, then a tracing log is displayed on the mobile device tracing items transit history from the manufacturing or assembly location thru to the retail bank which ultimately receives the cash.

As I further describe in patent application U.S. Ser. No. 14/206,628, in a fifth embodiment (as described in PPA 61/852,108 on pages 4-6, a "bank deposit" embodiment is depicted to illustrate the utility of the invention to make a deposit at a financial institution (See Endnote 9). In this embodiment, the deposit ticket is comprised of a reusable "card" that has a 2D scannable code printed on the card itself, or a label, sticker or decal applied to the card containing a scannable 2D bar code. Contained within the 2D scannable bar code is the customer's bank account number, the bank's routing number. As a preferred feature of this embodiment, a geodesic code that covers the user's home territory, such as city, county or state such that deposits made outside the user's home area can be more closely monitored and under certain adverse conditions prevented. Additionally within this embodiment, cash with a 2D bar code, can be deposited through application of this method such that the user scanned the bill's 2D bar code, then the deposit card 2D bar code, to affect a remote cash deposit through the user's smart-phone. The geodesic code feature on both the deposit card and bills ensure improved internal control as more fully discussed in the forth embodiment above.

As I further describe in patent application U.S. Ser. No. 14/206,628, in a sixth embodiment as described in PPA 61/852,108 on pages 34-36, a "signature validation" embodiment is depicted to illustrate the utility of the invention to validate document execution (See Endnote 10). In this embodiment, a user's identity has been previously validated in such a way as to be linked to their smart-phone or other mobile device.

When wishing to effect a signature validation on a document, the user's smart-phone or other mobile device, captures the geodesic code, identifying information such as the person's name, device identification information, and then transmits said information to a printer which then prints out as a scannable 2D bar code on the document itself or a label, decal or sticker, that is then attached to the document in such as way as to independently attest to the time and a place of the person's signature. In this embodiment, the person can also produce a scannable 2D embedded code in for or a graphics file such as JPG or PNG that can be scanned in an electronic document the same as from a paper document. Such preferred features of this embodiment would include a trusted 3d party validating party such as a bank, government agency or the like to verify the person's identity, image, signature and the like, and include such information in a database that is accessible by the application either directly or through a proxy identity known only to the validator and the validatee. Photo images would be encrypted and scrambled by cipher prior to electronic transmission ideally. Ideally, the embodiment includes one or more user validation steps to ensure they were indenting to affect a signature on a given document, and if used in conjunction with a notary, the notary would likewise have one or more validation steps to effect the attest function. Finally, it would preferred that the app kept a log accessible to the user at least by date order, along with one or more other indexing methods to recall specific documents executed. Persons performing notary services would have similar but separate index logs, but for all persons who received attest services. Email can be used to confirm the process. The steps herein would not preclude independent verification of a government issued ID as a validation step.

As I further describe in patent application U.S. Ser. No. 14/206,628, in seventh embodiment and the embodiments which follows describe a "check-in" embodiment connected a hardware device or other appliance. In this embodiment as described in PPA 61/852,108 on pages 30-32 depicts a "home security embodiment" where a user gains access to enter a home by scanning a 2D bar code displayed either electronically or on a sticker, label, decal or the like near the entrance to the home, which contains a unique code and/or identity information, and/or instructions for the device that when scanned cause the home system to disarm, record the device's hardware profile information, such and SIM ID or chip ID etc to authenticate the device, and calculate the time/date of the scan so as to keep an access log. (See Endnote 11). This embodiment facilitates a low cost method of generating an access key, such as in a hotel environment where there is high occupant turnover and a desire to generate new "keys". In this embodiment, it can operate either in such a way that the entrance contains a scanner that scans the personal object containing the 2D bar code or it can be a downloadable app, that is linked in such a way that when in proximity to the access point, the user's mobile device sends a proprietary electronic signal to a network, that in turn electronically unlocks the door. In this embodiment, the preferred embodiment employs a geodesic code in a similar fashion to the hospital embodiment such that the user's "key" software would only function when proximate to the linked geodesic code, with said code ideally being independently validated by the user's device. This embodiment is not limited to disarming the access or security system, but would likewise arm such a system. This embodiment is not limited to home access, but is also be well suited to an secure entry system for automobiles or other mobile devices such that the "key" can be sent electronically. In this embodiment, guest access can be granted and restricted at a very low per user cost.

As I further describe in patent application U.S. Ser. No. 14/206,628, in the eighth embodiment as described in PPA 61/852,108 on pages 33-34, an "electronic remote control/ setup" embodiment is depicted to illustrate the utility of the invention to serve as an electronic remote control platform (See Endnote 12). In this embodiment, the user scans a 2D scannable code displayed from an appliance such as a television, mobile ISP device, automobile, desktop software, or other configurable device. Contained in the 2D scannable code is the "setup" information for the device, plus as geodesic code that is linked to a database to provide the correct custom language for the device. For example, in the case of the television, scanning the 2D scannable code would identify the model number, and the user would then download the a virtual remote control interface correctly configured for his particular television using the predominant language of his geographic location by default. A validation step would preferably be included to ensure that the default based on geography was the desired language configuration. Ideally, the software would ensure that any connectable DVD or other types of "player" interfaces would play in the correct language based on the remote preferences. Some advantages to this embodiment are that multiple remotes can be generated for guests, family members etc as needed that are custom configured to the personal preferences of the user and the specific settings of the device. Another example illustrating this embodiment is illustrated by the example of remote ISP login, where the user scans a scannable 2D bar code containing access information about the ISP, including ideally the correct language for the user interface based on the geodesic code. A preferred feature in this embodiment would include a hardware identification feature so that the scanned 2D bar code would include information about the device such that any driver updates, patches, security updates, etc can be downloaded and applied based on the devices self reporting. And additional validation step can include hardware polling to verify the device hardware is in fact as reported; however, hardware polling is much slower which makes the scanned reporting the preferred approach in most instances. Some additional features can include Bluetooth, infrared connectivity to enable close proximity communications. The 2D bar codes as in other embodiments herein can be either displayed electronically or by label, sticker or decal. User manuals in digital form would be a preferred feature of this embodiment.

As I further describe in patent application U.S. Ser. No. 14/206,628, in the ninth embodiment as described in PPA 61/852,108 on pages 32-33, a "vehicle identification and management system" embodiment is depicted to illustrate the utility of the invention to serve facilitate the social management of vehicles (See Endnote 13). In this embodiment, in place of an alpha-numeric license tag, a 2D bar code is used that contains vehicle identification information plus a geodesic code, such that the device can be tracked from start-point to end-point with 100% accuracy. A preferred feature of this embodiment would include the feature that scanning the 2D bar code calculate the specific start point geodesic code at the trip beginning, and stop point geodesic code at the end of the trip such exact mileage is calculated.

Using this embodiment would facilitate efficient tracking, mileage accounting, and such for taxis and other commercial vehicles without the need to buy expensive "meters" like in a taxi. Further uses would include insurance tracking, support for road taxes based on actual travel. Preferably, this embodiment would be combined with the methods described in U.S. application Ser. No. 14/079,402, the disclosure of which is incorporated by reference herein, such that the scan would include an integrated payment method or any one of the payment embodiments described in this application.

Figure 7:
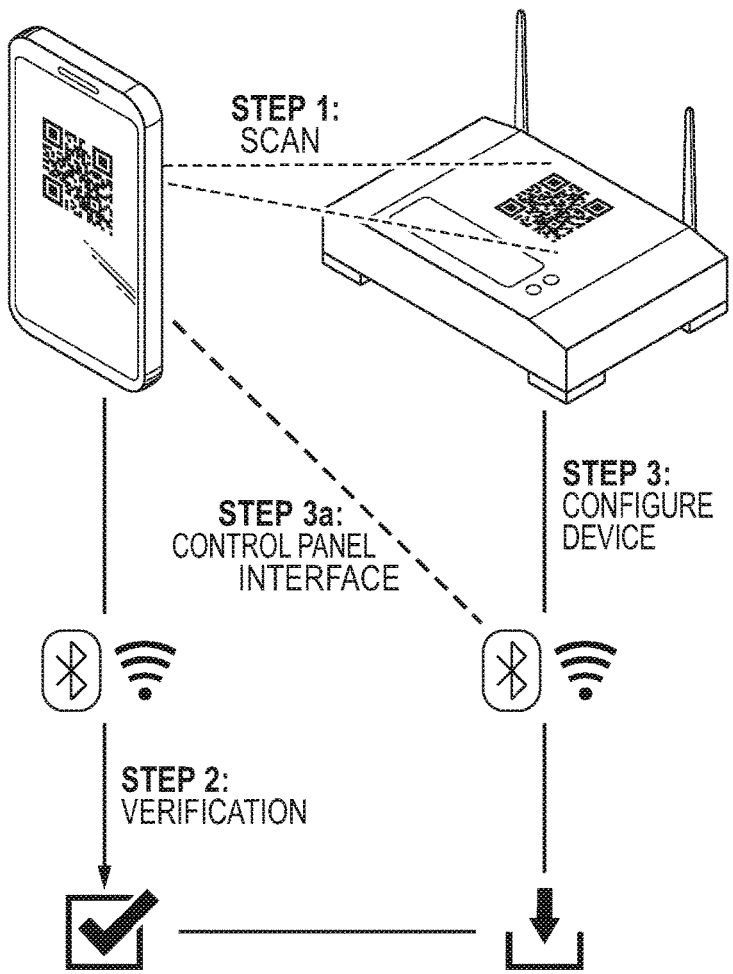
FIG. 7 depicts the electronic device embodiment of the invention.

FIG. 7 depicts an electronic device embodiment of the invention. The embodiment presented in this application depicts electronic device authentication prior to public use/ circulation, whereby the manufactured item or assembled item is a electronic network packet switching, routing device, or other internet service provider modem device, whereby an image of a 2D bar code or other scannable image, which yields a data string is presented, together with a business logo brand image to create a "scannable logo", which contains encoded identity data for the logo brand owner, encoded visual identification characteristics for the logo brand, encoded electronic device model characteristics, and encoded GPS data corresponding to manufacturing location for a manufactured item or assembled item. Preferably, this embodiment includes an encoded specific time period, only during which the image comprising the scannable logo can be displayed from a manufactured or assembled item, in such as way that it can be scanned for the first time by a mobile device. The image is scanned with the image scanning function of the mobile communication device and the encoded logo brand owner identity data, the encoded visually identifying characteristics for the logo brand, encoded electronic device model characteristics, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is initially launched at the manufacturing facility, and if the decoded identity data for the logo brand owner, decoded visual identification characteristics for the logo brand, electronic device model characteristics, and decoded GPS data are successfully matched against a registry database for validity, an inventory control log is created and/or incremented. Further, native programming language "firmware" is downloaded in response to successful initial authentication based on the decoded model number characteristics. User guides, software and other collateral materials to the electronic device are electronically linked, and a corresponding scannable logo can be applied to collateral materials prior to shipping the electronic device. Preferably, the scannable logo is affixed both to the chassis of the electronic device, and displayed through a visual display when the electronic device is activated. As with other embodiments, a tracing log is created as the electronic device is shipped from the manufacturing facility to the ultimate retailer, who sells the item to the consumer. The consumer, can also scan the scannable logo, and the electronic device is "automatically registered" by capturing the consumer's geo-location information through the mobile computing devices GPS function along with other consumer identification data.

Figure 8:
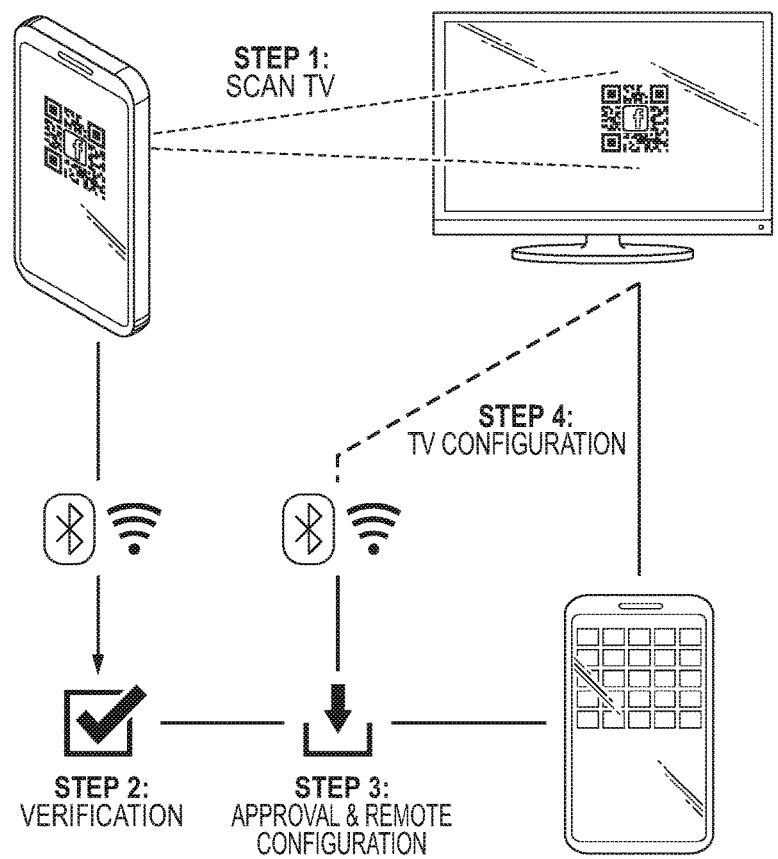
FIG. 8 depicts the remote control embodiment of the invention.

FIG. 8 depicts the remote control embodiment of the invention. The embodiment presented in this application describes the interactive process for the remote appliance control from the point of manufacture to the point of distribution to the retail consumer, whereby the electronically deliverable content is a software application that functions as a electronic appliance remote control, whereby an image of a 2D bar code or other scannable image which yields a data string is presented together with a business logo brand image to create a "scannable logo", which contains encoded identity data for the logo brand owner, encoded visual identification characteristics for the logo brand, encoded electronic device model characteristics, and encoded GPS data corresponding to a distribution region location for a digitally deliverable content. The image is scanned with the image scanning function of the mobile communication device and the logo brand owner identity data, the visually identifying characteristics of the scannable logo, encoded electronic device model characteristics, and the encoded GPS location information is decoded with the image decoding function. The GPS location information is captured for the mobile communication device with the GPS function of the mobile communication device, and compared to the decoded GPS location information. Based on the decoded GPS information, as compared to the most probable languages of the region, corresponding instructions are displayed in the most probable written language associated with the given geo-location area and subject to use validation are saved on the user's local device. Additionally, when the authentication application is initially launched at the consumer's home, and if the decoded identity data for the logo brand owner, decoded visual identification characteristics for the logo brand, electronic device model characteristics, and decoded GPS data are successfully matched against a manufacturer's registry database for validity, the "remote control" is automatically registered to that device for a certain model appliance, and a manufacturer's control log is created and/or incremented. Further, native programming language "firmware" is downloaded in response to successful consumer authentication based on the decoded model number characteristics. User guides, software and other collateral materials to the electronic device are electronically linked, and a corresponding scannable logo can be applied to collateral materials prior to shipping the electronic device. Preferably, the scannable logo is affixed both to the chassis of the electronic device, and displayed through a visual display when the electronic device is activated. The consumer, can also scan the scannable logo, and the electronic device is "automatically registered" by capturing the consumer's geo-location information through the mobile computing devices GPS function along with other consumer identification data. Preferably, the logo identity data would include a serial number for the electronic device so connected to the virtual "remote control".

Figure 9:
FIG. 9 depicts the motorized vehicle embodiment of the invention.

FIG. 9 depicts the motorized vehicle embodiment of the invention. In the embodiment presented currently in this application relates to the authentication steps with respect to motor vehicles which occur between the manufacture, and delivery to the consumer, whereby the manufactured item is a motor vehicle or pre-manufactured home, whereby an image of a 2D bar code or other scannable image, which yields a data string is presented, together with a business logo brand image to create a "scannable logo", which contains encoded identity data for the logo brand owner, encoded visual identification characteristics for the logo brand, encoded Vehicle Identification Number and other model characteristics, and encoded GPS data corresponding to manufacturing location for a manufactured item or assembled item. Preferably, this embodiment includes an encoded specific time period, only during which the image comprising the scannable logo can be displayed from a manufactured or assembled item, in such as way that it can be scanned for the first time by a mobile device. The image is scanned with the image scanning function of the mobile communication device and the encoded logo brand owner identity data, the encoded visually identifying characteristics for the logo brand, encoded electronic device model characteristics, and the encoded GPS location information is decoded with the image decoding function. The GPS location information is captured for the mobile communication device with the GPS function of the mobile communication device, and compared to the decoded GPS location information. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is initially launched at the manufacturing facility, and if the decoded identity data for the logo brand owner, decoded visual identification characteristics for the logo brand, decoded Vehicle Identification Number, other model characteristics, and decoded GPS data are successfully matched against a registry database for validity, and simultaneously an inventory control log is created and/or incremented. User guides, software and other collateral materials to the electronic device are electronically linked, and a corresponding scannable logo can be applied to collateral materials prior to shipping the electronic device. Preferably, the scannable logo is affixed both to the chassis of the vehicle, and displayed through a visual display in the vehicle's instrument cluster when the vehicle is activated. As with other embodiments, a tracing log is created as the electronic device is shipped from the manufacturing facility to the ultimate retailer, who sells the item to the consumer. The consumer, can also scan the scannable logo, and the vehicle can be electronically registered" by capturing the consumer's geo-location information through the mobile computing devices GPS function along with other consumer identification data, which is forwarded to a state's vehicle registration department for e-registering in real time.

FIG. 10 depicts a manufactured item for consumer assembly embodiment. In another embodiment depicting in this application authentication where a manufactured item is sold in "kit" form and assembled at the consumer's home address, an image of a 2D bar code or other scannable image, which yields a data string is presented, together with a business logo brand image to create a "scannable logo", which contains encoded identity data for the logo brand owner, encoded visual identification characteristics for the logo brand, and encoded GPS data corresponding to manufacturing location for the components to be assembled. As set for the in another embodiment, the manufactured components have a tracing log that can be viewed by scanning the scannable logos for each component or if a small item like screws, the contained. The image is scanned with the image scanning function of the mobile communication device and the encoded logo brand owner identity data, the encoded visually identifying characteristics for the logo brand, and the encoded GPS location information is decoded with the image decoding function. The GPS location information is captured for the mobile communication device with the GPS function of the mobile communication device, and compared to the decoded GPS location information matching the address coordinates or geo-coordinates of a consumer's address to activate the warranty for the item. If the decoded information is a geo-proximal match, an authentication application is launched in the computer function of the mobile communication device. The authentication application has certain required fields, which include time and date that the mobile device scans the scannable logo to effect authentication, which are automatically populated each time the authentication application is launched. Additionally, when the authentication application is launched, subsequent to the initial launch at the manufacturing facility, and if the decoded identity data for the logo brand owner, decoded visual identification characteristics for the logo brand, and decoded GPS data are successfully matched against a registry database for validity, then a tracing log for each sub-component is displayed on the mobile device tracing items transit history from the manufacturing thru to the assembly location, with the retail location of pickup being one entry.

As I further describe in patent application U.S. Ser. No. 14/206,628, in tenth embodiment/feature common to the preferred embodiments herein would provide a method as described in PPA 61/852,108 on pages 29-30 such that the bar codes can be recognized visually by type (See Endnote 14). This can include the use of color, such as a green dot on the otherwise black and white 2D bar code, but can also include a logo or icon design such that 2D bar codes that would provide information can contain a scripted "i", and 2D bar codes for money can contain a currency symbol. Further, this method can include a blended image+2D bar code that provides a pictorial representation (e.g. thumbnail), but the image also contains embedded scannable codes.

The embodiment in this application expands the use of this system to create an index electronically linked to a trusted registrar where multiple "layers" are users for different types of user access. For example, a red mark might indicate a government agency, a white mark a manufacturer, etc.

Though the personal property embodiments depicted are representative, other possible embodiments of the methods described herein would include an electronic devices with component chassis, a mobile device case, a rectangular "credit" card or debit card, an electronic disc or flash drive, an article of clothing, a wrist band, a component of an automobile, a component of an airplane, a component of a piece of military hardware, a sheet of letter paper, a receipt, a newspaper, magazine, a credit card protective sleeve, a dermal patch, a postage stamp, currency, a human appendage, a cup, bottle, or other container; or an electronic display such as on a CRT monitor, television, LCD, or other mobile display that virtually displays a brand or logo either alone or as part of a virtually depicted tangible property.

In another embodiment, the scannable logo is etched into metal wherein the electro-saltwater is used. A smooth flat piece of metal with the desired surface area sufficient to display a scannable logo is obtained, and a scannable design is applied to a plastic non-conductive material with an adhesive backing suitable to adhere flatly on the metal, but which will be laser etchable once applied. A small opening is left on the flat metal piece suitable to touch an electro-conductive cathode lead. The area behind the lead should be sealed with an plastic non-conductive material sufficient to keep the metal watertight. The design is then etched into the previously applied plastic, and then inspected to ensure the design is correct. The lead is connected to a electric current, and the etched plastic metal combination is lowered into a saltwater solution, and an anode is passed into the water to cause in electrolysis effect, thereby etching the metal. The plastic-metal assemblage is removed from the saltwater solution and dipped in a non-saltwater solution to halt the residual electrolysis. The plastic-metal assemblage is removed from the water, and the laser-etched plastic adhesive is removed, exposing the electro-etched scannable logo design. As a preferred feature, an invisible marking ink can be applied to the plastic-metal assemblage prior to removing the laser-etched plastic adhesive to improve the reliability of the scan.

In another embodiment, an electro-etched metal scannable logo design is inset into a plastic mold in such a way that the inset remains visible after the molding process is complete. The molding process is completed, and once removed the etched metal remains as a scannable logo.

Common to preferred embodiments in this application is the use of encryption. The data communication channel for the data transmissions is encrypted. A preferred feature of this embodiment would utilize a bar code image cipher (hashing the image) in combination with bit data channel encryption (128-2048 bits) across a high speed connection such as 3G, 4G, Wi-Max, or Wi-Fi, but the embodiments herein can be adapted to lower bandwidth by one skilled in the art. Additionally, while the embodiments are depicted where both the logo and corresponding scannable code(s) are visible, it is preferred that for all embodiments except for consumer point of view access, the 2D scannable codes are presented at frequencies above or below human visible light so as: 1. Not to affect the aesthetics of an any logo design, and 2. Not be visual to a viewer without the assistance of a camera capable of capturing such frequencies. The logo and one or more scannable 2D bar codes and be visually displayed in layers for scanning. Further, it preferred that the visual display incorporate a cipher to prevent unauthorized decoded without a key. Finally, the data packages sent across the computer networks should be encrypted in addition to encrypting the communication channels themselves.

Common to preferred embodiments in this application is a trusted registrar, which can be a mobile device manufacture, the company that develops the software applications for authentication, decryption, encryption, and data transmission, or the scannable logos, or a government agency like the U.S. Customs, the US Patent Office, or even the manufacturer of the a personal item, wherein the trusted registrar safeguards the data described in the embodiment such as the logo data, business identity data, and specified or predetermined time data. The trusted registrar causes other participants (manufacturer, consumer, distributor, shipper, software developer, etc) to subscribe to the scannable logo system, wherein some but not all aspects of the authentication, tracing logs or registry is viewable as would be appropriate to security concerns and their needed level of access.

Common to preferred embodiments is the feature of pre-determined or specified time. However, it should be noted that many different specifications are contemplated with respect to time period selection. For example, a government trademark registry may have a time period that expires with the payment of trademark fees. A city government may have a period limited by the timing of business permit fees, a consumer can limit timing with a warranty period, a merchant with the expiration of a reasonable time in a store, a manufacturer can limit a time to enable an item to be added to the master inventory list, a distributor can limit time to when a shipment is expected, and so forth. Thus, the "specified" or "pre-determined" time period is intended to be a flexible specification albeit essential element of practicing the invention.

As I further describe in patent application U.S. Ser. No. 14/206,628, is another embodiment depicting a payment method; wherein, a mobile device launches an application for purchasing a manufactured item, assembled item, or electronically deliverable item, a scannable 2D bar code is presented on an invoice, receipt or functionally equivalent electronic display for an for a manufactured item, assembled item, or electronically deliverable item, whereby an image of a 2D bar code or other scannable image which yields a data string is presented in response a validated authentication of a manufactured, assembled item, or electronically deliverable item providing for a buyer's mobile communication device with a camera function for scanning or capturing an image of the seller bar code and a keypad for entering a payment amount is provided. A remote electronic payment center for maintaining a buyer's account and making electronic payments from the buyer's account is provided. A wireless communication system for transmitting data, including data representative of the seller bar code image, and the payment amount, to the remote electronic payment center, is provided. Applications are present on the mobile communication device and at the remote payment center to enable data transmission of the data over the wireless communication system from the buyer's mobile communication device to the remote electronic payment center using a send command and to authorize the remote electronic payment center to electronically transfer funds from a buyer's account associated with the buyer's mobile communication device to the seller's account. The image of the seller bar code is scanned or captured from the invoice or sales receipt with the camera function of the buyer's mobile communication device and processed with the mobile communication device application to form a wirelessly transmittable seller data file. The seller data file is wirelessly transmitted from the mobile communication device to the electronic payment center. The payment data representative of a payment amount is wirelessly transmitted from the smart-phone to the electronic payment center. The buyer's account is electronically debited by the payment amount. The seller's account is electronically credited by the payment amount, and data representative of the crediting of the seller's account is electronically transmitted to the seller.

As I further describe in patent application U.S. Ser. No. 14/206,628, is another embodiment depicting a payment method with the scannable logo is presented on an inventory item, and directly scanned by the consumer to make a purchase. The method employs a seller bar code encoding information solely to enable electronic payment to a seller's account. The seller's account belongs to an intended recipient of the electronic payment. A buyer's mobile communication device with a camera function for scanning or capturing an image of the seller bar code and a keypad for entering a payment amount is also employed. A remote electronic payment center for maintaining a buyer's account and making electronic payments from the buyer's account is provided. A wireless communication system for transmitting data, including data representative of the seller bar code image, and the payment amount, to the remote electronic payment center is also used. A applications are present on the mobile communication device and at the remote payment center to enable data transmission of the data over the wireless communication system from the buyer's mobile communication device to the remote electronic payment center using a send command and to authorize the remote electronic payment center to electronically transfer funds from a buyer's account associated with the buyer's mobile communication device to the seller's account. An image of the seller bar code is provided at a point of sale for goods or services. The image of the seller bar code is scanned or captured with the camera function of the buyer's mobile communication device. The image is processed with the mobile communication device application to form a wirelessly transmittable seller data file. The seller data file is wirelessly transmitted from the mobile communication device to the electronic payment center. A payment data file representative of a payment amount is wirelessly transmitted from the smart-phone to the electronic payment center. The buyer's account is electronically debited by the payment amount and the seller's account is electronically credited by the payment amount. Data representative of the crediting of the seller's account is transmitted to the seller. An image of a bar code encoding identifying information for each item being purchased is presented on a manufactured item. Each image is scanned with the camera function of the mobile communication device. The identifying information for each item is saved in a computer memory device in association with the buyer's communication device.

Hired-Car App Embodiment

Incorporating the processes and embodiments previously described in this patent application application, a further embodiment is presented for an automated check-in and rider experience mobile device application comprised of two portions: 1. The first time user download/setup and the 2. existing user app experience.

First Time User Download/Setup: Assume that a person wants to travel from Miami, Fla. to Atlanta, Ga., and decides to call a hired car to transport service such as Uber, Lyft, a limo company, or cab, and after requested the ride, the user receives a text that the ride is on the way. Once in the car, the new embodiment is presented.

1. The user sees a tablet computer (or functionally equivalent) displaying inside the vehicle, with coupons for products and services (separately or integrated into ads) scrolling across the screen which contain a 2D bar code that can be scanned by the users phone, and alternatively a mobile phone number to receive the coupon for the product or service.
2. Once the correct number of digits is entered, a dialog box pops-up with the mobile number pre-filled in so it can be confirmed.
3. Once confirmed, a text is send to the user's mobile device linked to the entered phone number, and a link is also sent to invite the user to download a coupon app.
4. The user then can download the app, so that the next time they will experience the coupon app user experience.
5. The app allows for the registration of multiple devices linked to a common phone number.
6. The app also allows for the driver or the hired car to "check-in" and the driver and tablet are then paired in such a way that if someone removes the tablet from the proximity of the driver, the data on the tablet is wiped to ensure security.
7. The app allows for the functionality to send the coupons to email, or multiple devices simultaneously.
8. The app collects and stores quasi-public personal data which includes but is not necessarily limited to: user name, email address, zip code, state, device type, and thereafter creates a 2D bar code containing this information or a link to this information which can be entered by another device by scanning the coupon app user's mobile device.
9. The last name is "starred" out to like a password to protect the coupon app user's visual privacy so even the driver doesn't have the last name.
10. All information is stored in a database linked to the user's device with minimal information being retained either on the user's device or the hired car's tablet device.
11. The coupon app includes a user opt-in privacy policy.
12. The coupon app, will have the feature to text me with follow-up's periodically inviting me to download and install the app.
13. Downloading or installing the app can occur either through a recognized site such as Google play, or iTunes store or it could be a direct link download.
14. If I stop the installation process mid-stream, the app asks me if I want to try later, and then will prompt me.
15. The coupon app also includes (once installed) an automated handshake with the hired car tablet as a mobile WiFi hotspot so during any future visit the rider can use the hired car's WiFi, in lieu of an "login page" as is currently done in the industry. This includes functionality like in Google Chrome such that what is displayed on the user's phone can be displayed on the tablet for improved optics and user experience. So long as in close proximity, this feature will work.

Existing User App Experience: Assume that a person has downloaded and installed the hired car app in a manner consistent with the process flow above, and wished to take the same trip but using the installed app this time 1. The user opens the app, and is able to search for the nearest vehicle for hire within says a 5, 10, 20 or 50 mile radius for transportation with the views of available rides sorted in ways that include soonest ETA, and lowest ride cost.
2. The app captures the user's starting point the GPS calculated location or alternatively based on the "check-in" scanned location process as described in this application if there are many businesses or addresses resolving to a common way point.
3. As before, when the user gets into the hired car, there is a mounted tablet device available for viewing with coupons/ads scrolling in a loop on the device.
4. When the user's device is near the hired car tablet, there is an "auto-handshake" that allows the user's device to automatically notify the user of the Wi-Fi hotspot available, and the driver is notified of the passenger proximity. To use the Wi-Fi, the user scans thea 2D bar code presented on the table screen, which presents my login credentials without typing. This is a better practice than fully automatic connection like when the user is in proximity to their home WiFi network.
5. The user's selected destination has been previously input either by the user when requesting the ride or by the driver or by the corporate staff, and when the vehicle heads out, the ETA to the destination is displayed in the user hired car app.
6. The user can scan the 2D bar codes like before to capture coupons, but the process is automated in that the coupons are sent according to the user's preset preferences.
7. One of the preference options is to "clip" the coupons and put them into an electronic folder automatically by category for use by the user.
8. One additional feature would be to display on the hired car's tablet screen the content of the user's phone to improve the visual experience, in a similar fashion to have Google ChromeCast device displays on a television screen from an Android OS device. This display would present games, video viewing, maps, and specialty search sites like TripAdvisor and the like to make the user experience. All this would work when in proximity.
9. One additional included feature in the user's app would be a folder to contain and display the 2D bar code boarding passes for the airplane as a JPG so the user could display this instantly to airline personell and TSA check-in even when no WiFi was available later.
10. The user app would allow the feature of in-app purchases incorporating the 2D scanning processes described previously or other common methods such as NFC or mag-stripe scan.
11. As a automation step, it would be a best practice to incorporate a hardware device that incorporates an automated button such as those which are commercially available that can be plugged into to the 3.5 mm jack of the phone as a power source, and then can be programmed to perform 1 or more functions by pressing the plugged in device, which functions to register a programmable single key press in such a way that a single press or the device "button" causes the hired car app to scan/capture a 2D barcode, but returning an instruction to scan when the key is pressed, so that the smartphone's interface would not have to be unlocked or otherwise open before performing this single function. Ideally, a unique address would be embedded in the hardware to match to the phone so it could not be spoofed easily.

What is claimed is:

1. A method of authenticating a mark as a valid indication of origin of an item bearing the mark, said method comprising the steps of:

providing, in an electronic database, visual mark identity data for each of a plurality of marks;

providing, in the same electronic database as the visual mark identity data or in a different electronic database, confirmation data for each of the plurality of marks, with the confirmation data for each mark being electronically associate-able with the visual mark identity data to enable authentication of the mark as indicative of origin if present;

said confirmation data including at least one of scanned within a predetermined time range;

scanned within a predetermined geographical area;

scanned positive for at least one predetermined machine-readable but visually invisible characterizing feature;

visually displaying one or more of said plurality of marks from an item bearing the mark;

electronically scanning each displayed mark;

electronically transferring visual mark identity data and the confirmation data to a processor;

and electronically determining in the processor from the visual mark identity data and the confirmation data whether the scanned mark is authenticated as an indication of origin.

2. A method, as in claim 1, wherein the confirmation data is scanned within a predetermined time period.

3. A method, as in claim 2, wherein the predetermined time period is based on government or quasi-government created statutory rules, a period designated by the software or the hardware device used to scan or display the mark, or by a period otherwise designated by a trusted registrar, merchant, consumer, government agency, hardware manufacturer, or software developer in the process of creating or displaying the mark.

4. A method, as in claim 3, wherein the trusted registrar is selected from the group consisting of a merchant, government agency, hardware manufacturer, or software developer individually or in concert with others, that maintains the physical or virtual custody of the visual mark identity data, and the confirmation data.

5. A method, as in claim 1, wherein the authenticating way of associating the confirmation data with the mark is by scanning the mark and electronically associating geo-location data of the scan with the visual mark identity database.

6. A method, as in claim 5, further comprising verifying authenticity of a manufactured item by scanning a mark that has been previously authenticated, and appending the geo-location data of the origin of manufacture of an item to the existing electronic database containing the visual mark identity data, the database containing the confirmation data, or another database.

7. A method, as in claim 6, further comprising verifying authenticity of a manufactured item by confirming an item's origin of manufacture in response to a determination that the scanned mark is associated with the previously appended origin of manufacturer geo-location data.

8. A method, as in claim 5, further comprising verifying authenticity of a manufactured item by scanning a mark that has been previously authenticated, and appending the geo-location data corresponding to a manufactured item's port of entry into a country, state or other geo-political entry point, to the existing electronic database containing the visual mark identity data, the database containing the confirmation data, or another database.

9. A method, as in claim 8, further comprising verifying authenticity of a manufactured item by confirming a manufactured item's port of entry into a country, state or other geo-political entry point in response to a determination that the scanned mark is associated with the previously appended port of entry geo-location data.

10. A method, as in claim 5, further comprising verifying authenticity of a manufactured item by scanning a mark that has been previously authenticated, and appending the geo-location data corresponding to a manufactured item's wholesale or retail location to the existing electronic database containing the identity data, the database containing the confirmation data, or another database.

11. A method, as in claim 10, further comprising verifying authenticity of a manufactured item by confirming a manufactured item's wholesale or retail location in response to a determination that the scanned mark is associated with the previously appended wholesale or retail geo-location data.

12. A method, as in claim 1, wherein the authenticating way of associating the confirmation data for the mark with the visual identity data for the mark includes encrypting the data communication channel used to display mark, or encrypting the visual identity data communication channel for the mark, or encrypting the confirmation data communication channel from one network address point to another network address point.

13. A method, as in claim 1, wherein the authenticating way of associating the confirmation data for the mark with brand or logo visual identity data for the mark includes embodying encrypted data in the mark displayed from the item, and electronically decrypting the image of the mark, and the confirmation data includes whether the mark embodies encrypted data.

14. A method, as in claim 13, wherein the encrypted data embodied by the mark is not human-visible without a device that images at frequencies above or below the range of human visible light, and said method further comprising electronically decrypting the mark so displayed from the personal object.

15. A method, as in claim 13, wherein the encrypting of the encrypting of the mark includes shifting a pixel's location within the mark according to a predetermined pattern, and electronically decrypting the shifted pixel's location.

16. A method, as in claim 1, wherein displaying the mark comprises displaying a decal, label, sticker, or visual display of a scannable design which yields a data string.

17. A method, as in claim 1, wherein displaying the mark comprises displaying a decal, label, sticker, with a bar code or other scannable design which yields a data string.

18. A method, as in claim 1, wherein displaying the mark comprises electronically visually displaying a bar code or other scannable design which yields a data string.

19. A method, as in claim 1, further comprising engraving or molding a 2D scannable mark into an item during the manufacturing process in such a way that the displayed mark can be electronically scanned to yield a data string.

20. A method, as in claim 1, where the item bearing the mark is selected from the group consisting of an electronic component chassis, a smart-phone case, a rectangular "credit" card, an electronic disc or flash drive, an article of clothing, a wrist band, a component of an automobile, a component of an airplane, a component of a piece of military hardware, a sheet of letter paper, a receipt, a newspaper, magazine, a credit card protective sleeve, a dermal patch, a postage stamp, currency, a human appendage, a cup, bottle, or other container; or an electronic display such as on a CRT monitor, television, LCD, or other mobile display that shows the mark on a visual display.

21. A method, as in claim 1, where the steps of transferring, determining, and authenticating are performed electronically by software residing on a mobile computer operated by a trusted registrar, merchant, consumer, government agency, hardware manufacturer, or software developer.

* * * * *